(12) United States Patent
Kobayashi et al.

(10) Patent No.: US 11,536,994 B2
(45) Date of Patent: Dec. 27, 2022

(54) LIQUID CRYSTAL DEVICE, ELECTRONIC APPARATUS, AND MOBILE BODY

(71) Applicant: SEIKO EPSON CORPORATION, Tokyo (JP)

(72) Inventors: Hironori Kobayashi, Chino (JP); Norichika Muraki, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/406,570

(22) Filed: Aug. 19, 2021

(65) Prior Publication Data

US 2021/0382339 A1 Dec. 9, 2021

Related U.S. Application Data

(63) Continuation of application No. 16/727,313, filed on Dec. 26, 2019, now Pat. No. 11,126,023.

(30) Foreign Application Priority Data

Dec. 27, 2018 (JP) .............................. JP2018-244215

(51) Int. Cl.
*G02F 1/133* (2006.01)
*G02F 1/1345* (2006.01)
*G02F 1/1343* (2006.01)

(52) U.S. Cl.
CPC ...... *G02F 1/13306* (2013.01); *G02F 1/13452* (2013.01); *G02F 1/134309* (2013.01)

(58) Field of Classification Search
CPC ........... G02F 1/13306; G02F 1/134309; G02F 1/13452

USPC .......................................................... 349/33
See application file for complete search history.

(56) References Cited

U.S. PATENT DOCUMENTS

| 4,734,688 | A | * | 3/1988 | Adams .................... G09G 3/18 |
| | | | | 349/33 |
| 5,160,920 | A | | 11/1992 | Harris |
| 2008/0074136 | A1 | | 3/2008 | Shiraki et al. |
| 2010/0117675 | A1 | | 5/2010 | Shiraki et al. |
| 2013/0036335 | A1 | | 2/2013 | Kim et al. |

(Continued)

FOREIGN PATENT DOCUMENTS

| CN | 104297614 A | 1/2015 |
| JP | S54-096394 A | 7/1979 |
| JP | 2010-191351 A | 9/2010 |

(Continued)

*Primary Examiner* — Edward J Glick
*Assistant Examiner* — William D Peterson
(74) *Attorney, Agent, or Firm* — Oliff PLC

(57) ABSTRACT

A liquid crystal device includes a liquid crystal panel and a liquid crystal driver. The liquid crystal panel includes a segment electrode, a segment signal line connected to the segment electrode, and a segment signal line connected to the segment electrode. The liquid crystal driver includes a segment terminal to be connected to the segment signal line, a segment driving circuit that outputs a segment driving signal to the segment terminal, a segment terminal to be connected to the segment signal line, and an anomalous segment detection circuit that detects anomalous driving of the segment electrode based on a segment monitoring signal that is input to the segment terminal from the segment electrode via the segment signal line.

12 Claims, 28 Drawing Sheets

(56) References Cited

U.S. PATENT DOCUMENTS

2013/0082843 A1* 4/2013 Wurzel ................ G06F 1/1601
                                                                       324/525
2014/0168198 A1   6/2014 Tan et al.

FOREIGN PATENT DOCUMENTS

| JP | 2014-019300 A | 2/2014 |
| JP | 2014-021275 A | 2/2014 |

* cited by examiner

LIQUID CRYSTAL DEVICE, ELECTRONIC APPARATUS, AND MOBILE BODY

CROSS REFERENCE TO RELATED APPLICATION

This application is a continuation of U.S. application Ser. No. 16/727,313, filed Dec. 26, 2019, the contents of which are incorporated herein by reference.

The present application is based on, and claims priority from JP Application Serial Number 2018-244215, filed Dec. 27, 2018, the disclosure of which is hereby incorporated by reference herein in its entirety.

BACKGROUND

1. Technical Field

The present disclosure relates to a liquid crystal device, an electronic apparatus, a mobile body, and the like.

2. Related Art

Segment type liquid crystal devices are known in which liquid crystal cells having shapes in accordance with the shapes of items to be displayed are provided in a liquid crystal panel. The liquid crystal cell includes a liquid crystal, and a segment electrode and a common electrode for applying a voltage to the liquid crystal. The liquid crystal device includes a liquid crystal driver that drives the liquid crystal panel, and the liquid crystal driver controls the light transmittance of the liquid crystal by driving the segment electrode and the common electrode. As a result of the liquid crystal driver controlling the light transmittance of the liquid crystal, an item to be displayed is displayed in the liquid crystal panel. Note that the liquid crystal device is not limited to the display device, and is used in a liquid crystal shutter that controls transmission and blocking of light, and the like.

A known technology of the segment type liquid crystal device is disclosed in JP-A-54-96394, for example. In the technology in JP-A-54-96394, one segment electrode and the liquid crystal driver are connected by one signal line, and the liquid crystal driver drives the segment electrode by outputting a segment driving signal to the signal line.

In the liquid crystal device described above, if the output of the liquid crystal driver is anomalous, the segment electrode or the common electrode cannot be properly driven. When a display is taken as an example, as a result of the segment electrode or the common electrode being not properly driven, an anomalous display occurs. In JP-A-54-96394 described above, one segment electrode and the liquid crystal driver is connected by one signal line. Therefore, there is a problem in that, even if, provisionally, anomaly detection is performed at the output of the liquid crystal driver, if an anomaly such as disconnection has occurred in the signal line of the liquid crystal panel, the anomaly cannot be detected.

SUMMARY

One aspect of the present disclosure relates to a liquid crystal device including a liquid crystal panel, and a liquid crystal driver configured to drive the liquid crystal panel. The liquid crystal panel includes: a first segment electrode; a first segment signal line connected to the first segment electrode; and a second segment signal line connected to the first segment electrode. The liquid crystal driver includes: a first segment terminal to be connected to the first segment signal line; a segment driving circuit configured to output a first segment driving signal for driving the first segment electrode to the first segment terminal; a second segment terminal to be connected to the second segment signal line; and an anomalous segment detection circuit configured to detect anomalous driving of the first segment electrode based on a segment monitoring signal input to the second segment terminal from the first segment electrode via the second segment signal line.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a preferable embodiment of the disclosure will be described in detail. Note that the embodiment described below is not intended to unduly limit the content of the disclosure described in the scope of the claims, and not all configurations described in this embodiment are necessarily essential as solving means of the disclosure.

1. Liquid Crystal Device

A case where the liquid crystal device is a liquid crystal display device will be described in the following, as an example, but the liquid crystal device is not limited to the liquid crystal display device. For example, the liquid crystal device may be a liquid crystal shutter. An exemplary configuration of the liquid crystal shutter will be described later.

Figure 1:
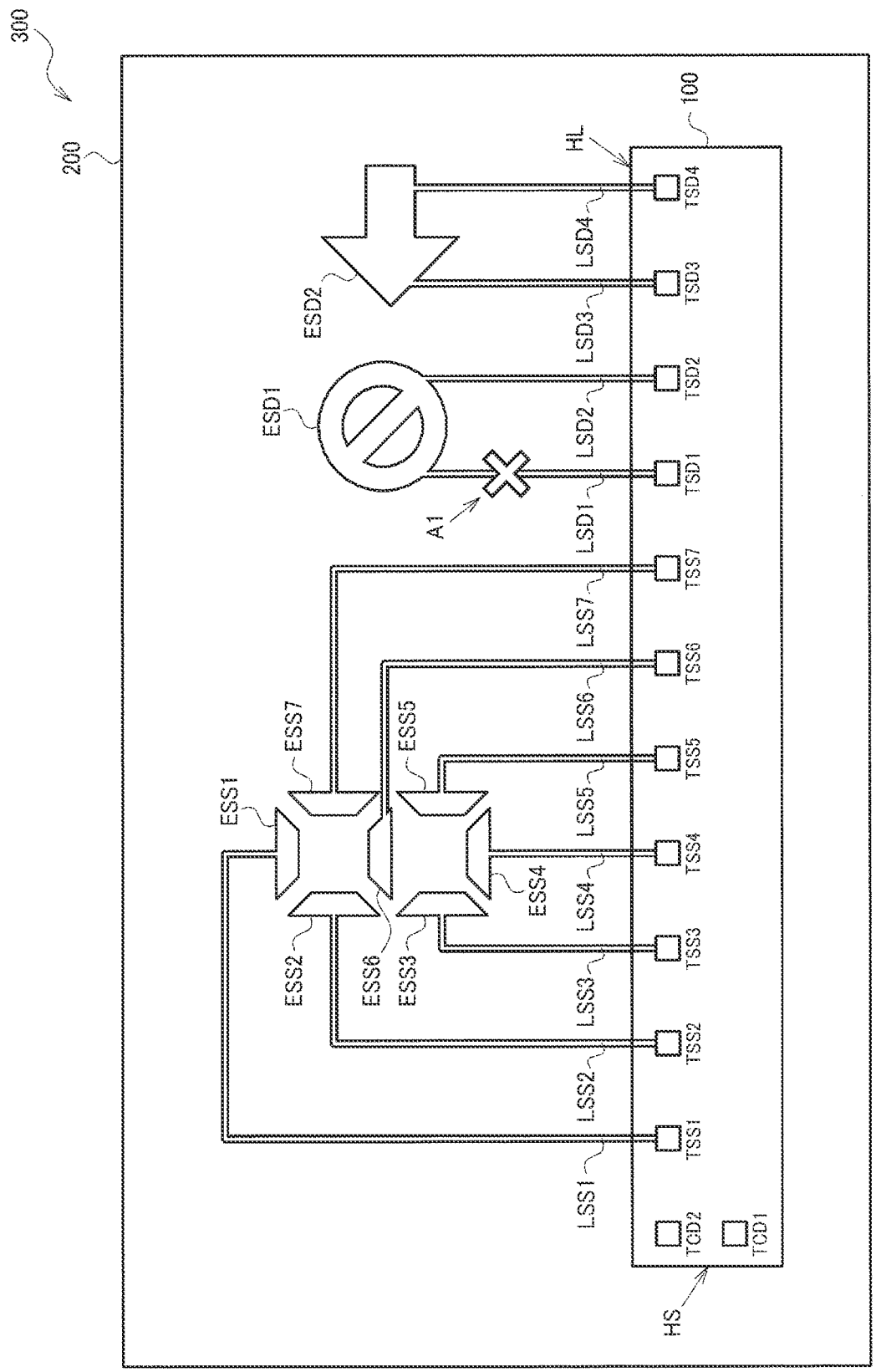
FIG. 1 is a first exemplary configuration of a liquid crystal device.
Figure 2:
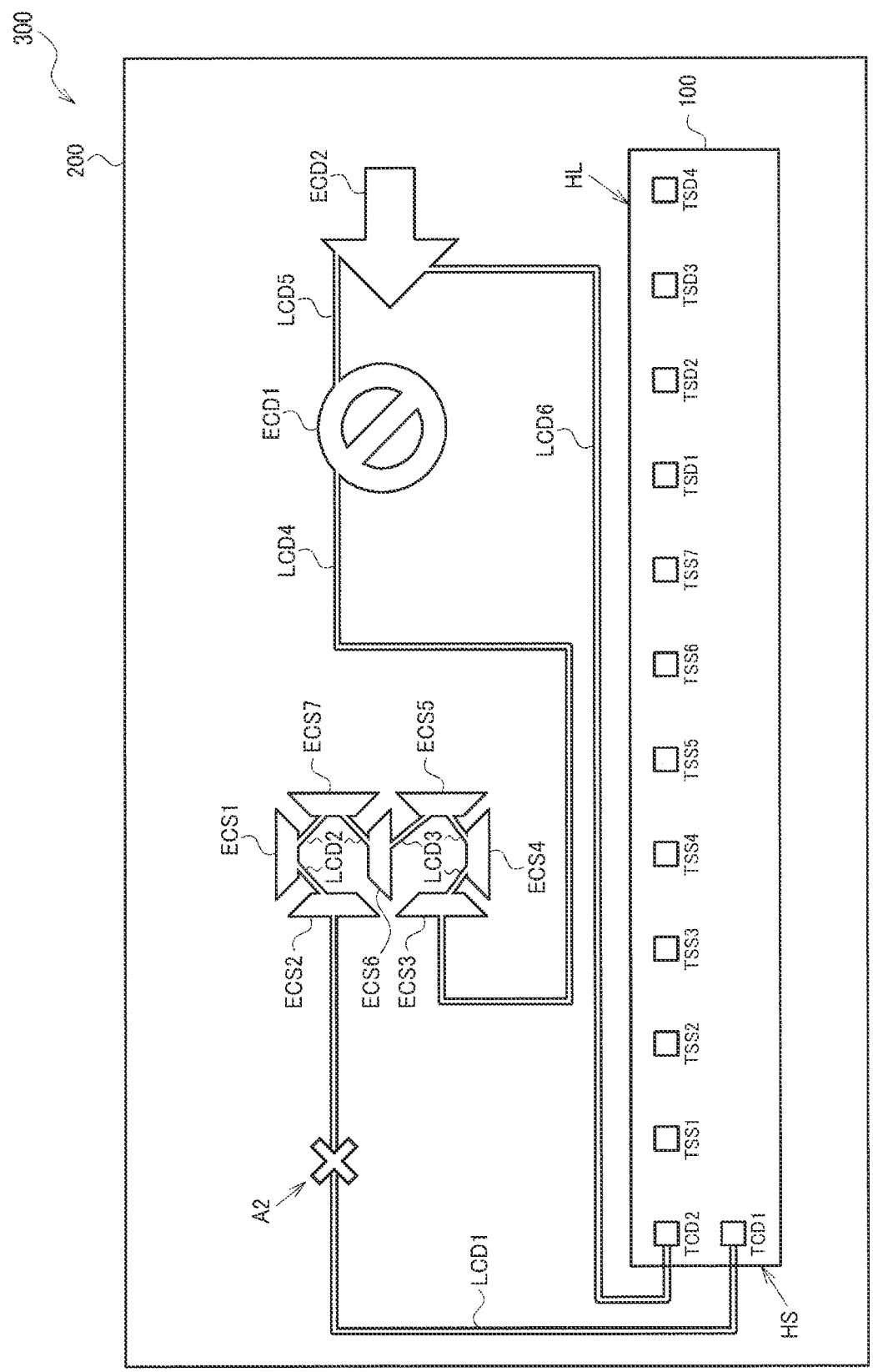
FIG. 2 is the first exemplary configuration of the liquid crystal device.

FIGS. 1 and 2 show a first exemplary configuration of a liquid crystal device 300. The liquid crystal device 300 includes a liquid crystal panel 200 and a liquid crystal driver 100 that drives the liquid crystal panel 200. Segment electrodes and an exemplary connection configuration thereof are shown in FIG. 1, and common electrodes and an exemplary connection configuration thereof are shown in FIG. 2. Note that the liquid crystal panel 200 includes a glass substrate on which the segment electrodes are provided, a glass substrate on which the common electrodes are provided, and a liquid crystal provided therebetween. Note that these constituent elements are not illustrated in FIG. 1, and the detail thereof will be described later.

As shown in FIG. 1, the liquid crystal panel 200 includes segment electrodes ESD1, ESD2, and ESS1 to ESS7, and segment signal lines LSD1 to LSD4 and LSS1 to LSS7. The liquid crystal driver 100 includes segment terminals TSD1 to TSD4 and TSS1 to TSS7.

The segment electrodes and the segment signal lines are transparent conductive films provided on the glass substrate. The transparent conductive films are made of ITO (Indium Tin Oxide), for example. Portions, of the transparent conductive films, that face the common electrodes, with the liquid crystal being interposed therebetween are segment electrodes, and portions that supply segment driving signals to the respective segment electrodes are segment signal lines. For example, the segment electrode ESD1 and the segment signal lines LSD1 and LSD2 are formed by an integrated transparent conductive film. A portion, of the transparent conductive film, that faces the common electrode ECD1 in FIG. 2 is the segment electrode ESD1.

The liquid crystal driver 100 is mounted on the glass substrate of the liquid crystal panel 200. Specifically, the liquid crystal driver 100 is an integrated circuit device, and pads formed on a semiconductor substrate thereof correspond to the segment terminals TSD1 to TSD4 and TSS1 to TSS7. Also, the semiconductor substrate is mounted on the liquid crystal panel 200 such that the face on which the pads are provided faces the glass substrate of the liquid crystal panel 200. Here, the segment terminal TSD1 is connected to the segment signal line LSD1 via a metal bump, for example. Similarly, the segment terminals TSD2 to TSD4 and TSS1 to TSS7 are respectively connected to the segment signal lines LSD2 to LSD4 and LSS1 to LSS7. Note that FIG. 1 shows a state in which a face, of the faces of the semiconductor substrates, on which the segment terminals are not provided is visible, but the segment terminals and the like that are hidden by the semiconductor substrate are also illustrated.

The liquid crystal driver 100 drives the segment electrode ESD1 via the segment signal line LSD1 by outputting a segment driving signal from the segment terminal TSD1. The segment electrode ESD1 has a predetermined icon shape, and as a result of the liquid crystal driver 100 driving the segment electrode ESD1, the icon is controlled to be displayed or not to be displayed. Also, the segment driving signal is fed back from the segment electrode ESD1 to the segment terminal TSD2 via the segment signal line LSD2. This fed-back segment driving signal is referred to as a segment monitoring signal. The liquid crystal driver 100 detects anomalous driving of the segment electrode ESD1 based on the segment monitoring signal input to the segment terminal TSD2. The anomalous driving of a segment electrode means the state in which the segment driving signal that should be originally applied to the segment electrode is not applied. For example, as will be described later, this is caused by an anomaly in the segment signal line, a connection failure at the segment terminal, an anomaly in the segment driving signal, and the like.

Similarly, the liquid crystal driver 100 drives the segment electrode ESD2 by outputting a segment driving signal from the segment terminal TSD3. Also, the liquid crystal driver 100 detects anomalous driving of the segment electrode ESD2 based on a segment monitoring signal input to the segment terminal TSD4.

The liquid crystal driver 100 drives the segment electrodes ESS1 to ESS7 by outputting segment driving signals from the segment terminal TSS1 to TSS7 via the segment signal line LSS1 to LSS7, respectively. The segment electrodes ESS1 to ESS7 are shaped so as to display a numeric character. As a result of the liquid crystal driver 100 driving the segment electrodes ESS1 to ESS7, the numeric character is controlled to be displayed or not to be displayed, or the type of the numeric character to be displayed is changed. With respect to the segment electrodes ESS1 to ESS7, feedbacking of the segment monitoring signals is not performed in the present embodiment.

Assume that an anomaly has occurred in the segment signal line LSD1 of the liquid crystal panel 200, as indicated by A1. The anomaly in a segment signal line is disconnection or a short circuit of the segment signal line, for example. Alternatively, assume that a connection failure of the segment terminal TSD1 has occurred. Here, the segment driving signal output from the segment terminal TSD1 is no longer applied to the segment electrode ESD1. In the present embodiment, since the segment monitoring signal is fed back to the liquid crystal driver 100 via the segment signal line LSD2 and the segment terminal TSD2, the liquid crystal driver 100 can detect the anomaly based on the segment monitoring signal.

Also, when an anomaly has occurred in the segment driving signal output from the segment terminal TSD1 of the liquid crystal driver 100, the liquid crystal driver 100 can detect the anomaly, not limited to the anomaly in the segment signal line LSD1, based on the segment monitoring signal. The anomaly in the segment driving signal refers to a state in which the signal level of the segment driving signal is not a signal level that should be originally output due to a failure in a circuit, disconnection, a short circuit, or the like in the liquid crystal driver 100.

In FIG. 1, ESD1 is denoted as a first segment electrode, and ESS1 is denoted as a second segment electrode. ESD1, which is the first segment electrode, is connected to the liquid crystal driver 100 via LSD1, which is a first segment signal line, and LSD2, which is a second segment signal line. ESS1, which is the second segment electrode, is connected to the liquid crystal driver 100 via LSS1, which is a third segment signal line. Specifically, the second segment electrode is connected to the liquid crystal driver 100 via only the third segment signal line. Also, LSD1, which is the first segment signal line, is connected to the driver 100 via TSD1, which is a first segment terminal of the driver 100, and LSD2, which is the second segment signal line, is connected to the driver 100 via TSD2, which is a second segment terminal.

In this way, an electrode from which a segment monitoring signal is fed back, and an electrode from which a segment monitoring signal is not fed back can be provided in the liquid crystal panel 200. For example, whether or not anomalous driving detection is to be performed or not can be set depending on the degree of importance of an item to be displayed, as will be described in the following, for example.

A cluster panel for an automobile can be envisioned as the liquid crystal device 300, for example. Segment electrodes for displaying icons, numeric characters, characters, meters, and the like are provided in the cluster panel.

Segment electrodes, of these segment electrodes, whose degree of importance is relatively high are each provided with a segment signal line and a segment terminal for feedbacking a segment monitoring signal. In the example in FIG. 1, the segment electrodes ESD1 and ESD2 for displaying icons are each provided with a segment signal line and a segment terminal for feedbacking a segment monitoring signal.

On the other hand, segment electrodes whose degree of importance is relatively low are each provided with only a segment signal line and a segment terminal for supplying a segment driving signal. In the example in FIG. 1, the segment electrodes ESS1 to ESS7 for displaying a numeric character are each provided with only a segment signal line and a segment terminal for supplying a segment driving signal. Note that, when the liquid crystal panel 200 includes segment electrodes for displaying a character or a meter, these segment electrodes may each be provided with only a segment signal line and a segment terminal for supplying a segment driving signal.

In this way, anomalous driving of a segment electrode whose degree of importance is relatively high can be detected. Also, as a result of not detecting anomalous driving of a segment electrode whose degree of importance is relatively low, the circuit scale of the liquid crystal driver 100 can be reduced.

Next, the common electrode will be described. As shown in FIG. 2, the liquid crystal panel 200 includes common electrodes ECD1, ECD2, and ECS1 to ECS7 and common signal lines LCD1 to LCD6. The liquid crystal driver 100 includes common terminals TCD1 and TCD2.

The common electrodes and the common signal lines are transparent conductive films provided on the glass substrate. Portions, of the transparent conductive films, that face the segment electrodes, with the liquid crystal being interposed therebetween are common electrodes, and portions that supply common driving signals to the common electrodes are common signal lines.

The common terminals TCD1 and TCD2 are pads formed on the semiconductor substrate of the liquid crystal driver 100. The common terminal TCD1 is connected to the common signal line LCD1 via a metal bump, for example. Similarly, the common terminal TCD2 is connected to the common signal line LCD6.

The common electrode ECS1 faces the segment electrode ESS1 with the liquid crystal being interposed therebetween. Similarly, the common electrodes ECS2 to ECS7, ECD1, and ECD2 respectively face the segment electrodes ESS2 to ESS7, ESD1, and ESD2 with the liquid crystal being interposed therebetween. The common electrodes ECS1 to ECS7, ECD1, and ECD2 are connected in series between the common signal line LCD1 and the common signal line LCD6. That is, the common signal line LCD1 is connected to the common electrode ECS2, and the common electrodes ECS2, ECS1, ECS7, and ECS6 are connected in series in the stated order by common signal lines LCD2. Also, the common electrodes ECS6, ECS5, ECS4, and ECS3 are connected in series in the stated order by common signal lines LCD3. Also, the common electrode ECS3 and the common electrode ECD1 are connected by a common signal line LCD4, the common electrode ECD1 and the common electrode ECD2 are connected by a common signal line LCD5, and a common signal line LCD6 is connected to the common electrode ECD2.

The liquid crystal driver 100 drives the common electrodes ECS1 to ECS7, ECD1, and ECD2 via the common signal lines LCD1 to LCD5 by outputting a common driving signal from the common terminal TCD1. Also, the common driving signal is fed back to the common terminal TCD2 from the common electrode ECD2 via the common signal line LCD6. This fed-back common driving signal is referred to as a common monitoring signal. The liquid crystal driver 100 detects anomalous driving of the common electrodes ECS1 to ECS7, ECD1, and ECD2 based on the common monitoring signal input to the common terminal TCD2. The anomalous driving of a common electrode means the state in which the common driving signal that should be originally applied to the common electrode is not applied. For example, as will be described later, this is caused by an anomaly in the common signal line, a connection failure at the common terminal, an anomaly in the common driving signal, and the like.

Assume that an anomaly has occurred in the common signal line LCD1 as indicated by A2. The anomaly in a common signal line is disconnection or short circuit of the common signal line, for example. Alternatively, assume that a connection failure of the common terminal TCD1 has occurred. Here, the common driving signal output from the common terminal TCD1 is no longer applied to the common electrodes ECS1 to ECS7, ECD1, and ECD2. In the present embodiment, since the common monitoring signal is fed back to the liquid crystal driver 100 via the common signal line LCD6 and the common terminal TCD2, the liquid crystal driver 100 can detect an anomaly based on the common monitoring signal.

Also, when an anomaly has occurred in the common driving signal output from the common terminal TCD1 of the liquid crystal driver 100, the liquid crystal driver 100 can detect the anomaly, not limited to the anomaly in the common signal line, based on the common monitoring signal. The anomaly in the common driving signal refers to a state in which the signal level of the common driving signal is not a signal level that should be originally output due to a failure in a circuit, disconnection, a short circuit, or the like in the liquid crystal driver 100.

2. Liquid Crystal Driver

Figure 3:
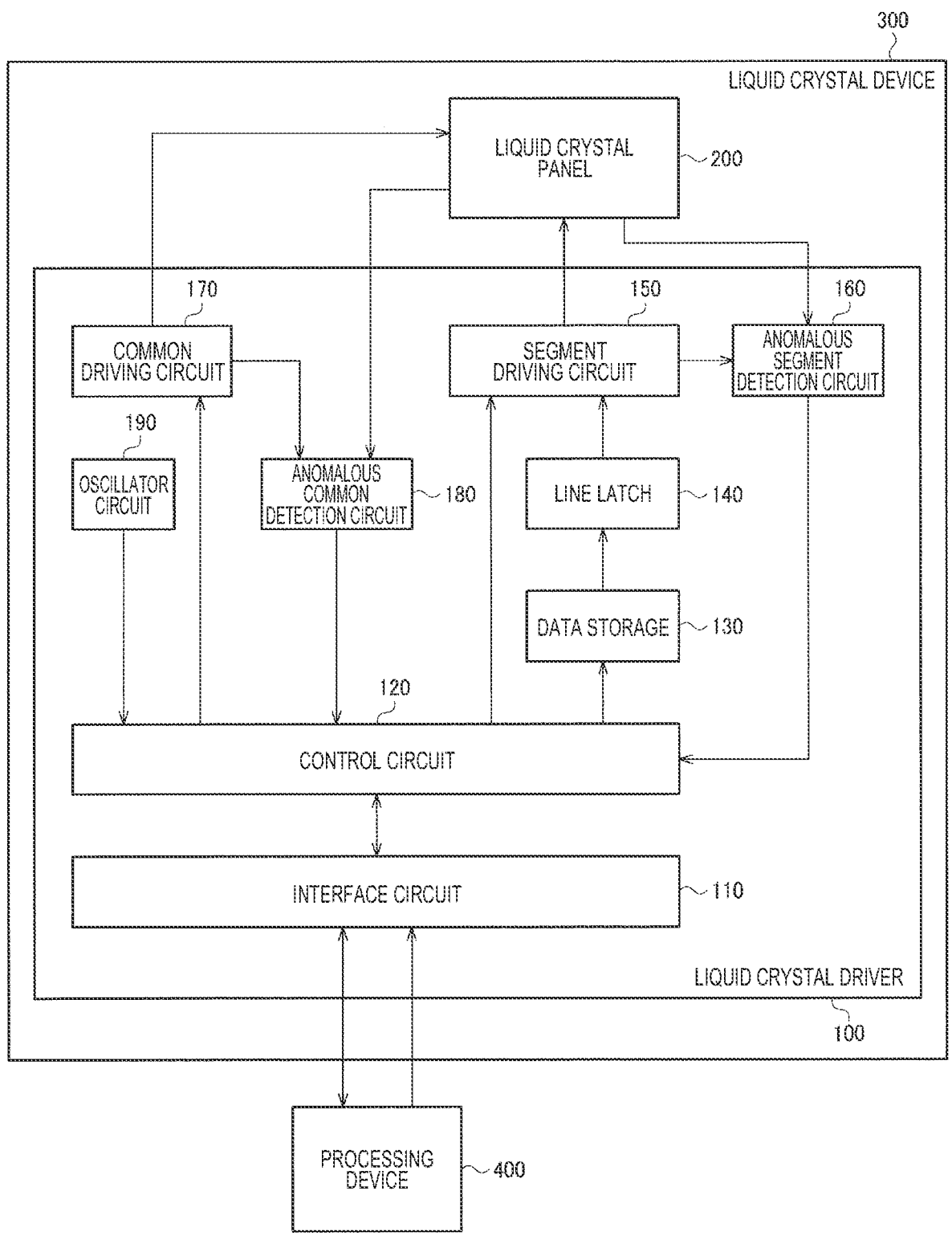
FIG. 3 is a first detailed exemplary configuration of a liquid crystal driver.

FIG. 3 is a first detailed exemplary configuration of the liquid crystal driver 100. The liquid crystal driver 100 includes an interface circuit 110, a control circuit 120, a data storage 130, a line latch 140, a segment driving circuit 150, an anomalous segment detection circuit 160, a common driving circuit 170, an anomalous common detection circuit 180, and an oscillator circuit 190.

The interface circuit 110 performs inter-circuit communication between the liquid crystal driver 100 and a processing device 400. Specifically, the interface circuit 110 receives segment driving data from the processing device 400. The segment driving data is data for controlling display with respect to each segment electrode. For example, in the case of static driving, the segment driving data is data for turning the display on or off with respect to the segment electrode. Alternatively, when PWM driving is performed in static driving, the segment driving data is data for setting the display tone with respect to a segment electrode. The processing device 400 is a host device of the liquid crystal driver 100, and is a processor or a display controller, for example. The processor is a CPU, a microcomputer, or the like. A serial interface system such as the I2C (Inter Integrated Circuit) system or the SPI (Serial Peripheral Interface) system can be adopted as the communication system of the interface circuit 110. Alternatively, a parallel interface system may be adopted as the communication system of the interface circuit 110. The interface circuit 110 can include an input/output buffer circuit and a control circuit for realizing such communication systems.

The control circuit 120 is a logic circuit, and operates based on a clock signal input from the oscillator circuit 190. The control circuit 120 controls the drive timing when the liquid crystal driver 100 drives the liquid crystal panel 200. Specifically, the control circuit 120 stores segment driving data received from the interface circuit 110 in the data storage 130. Also, the control circuit 120 performs control such that, in each frame, the segment driving circuit 150 outputs a segment driving signal corresponding to the frame. Also, the control circuit 120 performs control such that the driving polarity is inverted frame by frame.

The data storage 130 stores segment driving data. The data storage 130 is a so-called display data RAM. Alternatively, the data storage 130 may be a register.

The line latch 140 latches one frame's worth of segment driving data read out from the data storage 130. The line latch 140 is constituted by flip-flop circuits, for example.

The segment driving circuit 150 drives the segment electrodes of the liquid crystal panel 200 based on the segment driving data latched in the line latch 140. That is, the segment driving circuit 150 drives the segment electrodes by outputting segment driving signals corresponding to the segment driving data from the segment terminals, respectively. The segment driving signals are each a signal at a low level or a high level. In the case of the PWM driving, the segment driving signal changes from a high level to a low level, or from a low level to a high level in one frame. This change timing is determined in accordance with the tone.

The anomalous segment detection circuit 160 detects anomalous driving of a segment electrode based on a segment monitoring signal fed back from the segment electrode. That is, the anomalous segment detection circuit 160 determines whether or not the segment driving signal or a signal having the same logic level as the segment driving signal matches the segment monitoring signal. The anomalous segment detection circuit 160 determines, upon determining that these signals do not match, that anomalous driving has occurred, and determines, upon determining that these signals match, that the segment electrode is properly driven. The anomalous segment detection circuit 160 outputs the detection result to the control circuit 120. If the detection result indicates anomalous driving, the control circuit 120 notifies the processing device 400 of the anomalous driving via the interface circuit 110.

The common driving circuit 170 drives the common electrodes of the liquid crystal panel 200. That is, the common driving circuit 170 drives the common electrodes by outputting a common driving signal in accordance with the polarity from the common terminal. The common driving signal is a signal at a low level when in a positive polarity, and a signal at a high level when in a negative polarity.

The anomalous common detection circuit 180 detects anomalous driving of the common electrodes based on the common monitoring signal fed back from the common electrodes. That is, the anomalous common detection circuit 180 determines whether or not the common driving signal or a signal having the same logic level as the common driving signal matches the common monitoring signal. The anomalous common detection circuit 180 determines, upon determining that these signals do not match, that anomalous driving has occurred, and determines, upon determining that these signals match, that the common electrodes are properly driven. The anomalous common detection circuit 180 outputs the detection result to the control circuit 120. If the detection result indicates anomalous driving, the control circuit 120 notifies the processing device 400 of the anomalous driving via the interface circuit 110.

3. Segment Driving Circuit and Anomalous Segment Detection Circuit

Figure 4:
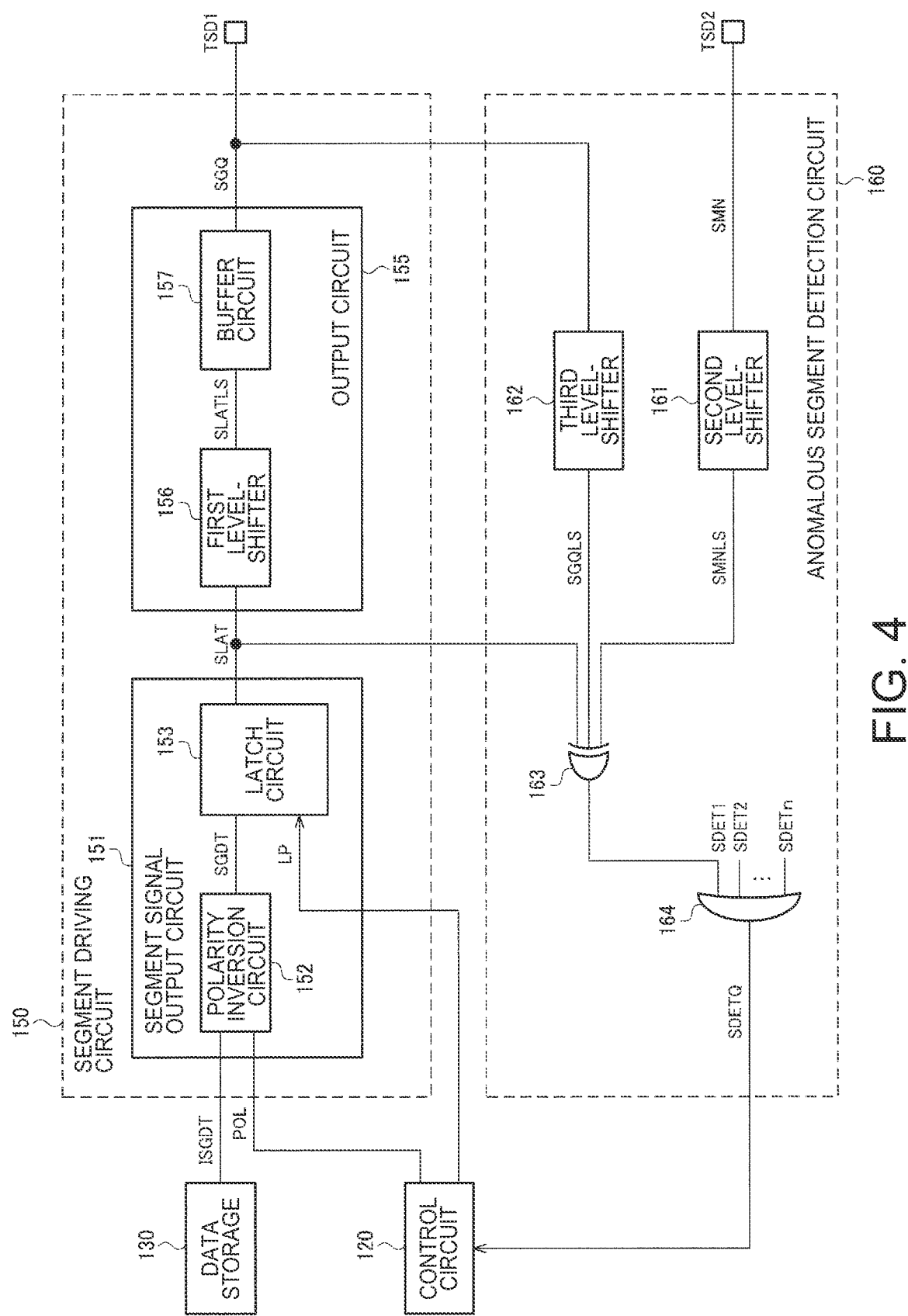
FIG. 4 is a first detailed exemplary configuration of a segment driving circuit and an anomalous segment detection circuit.

FIG. 4 shows a first detailed exemplary configuration of the segment driving circuit 150 and the anomalous segment detection circuit 160. Note that, in the following, the segment driving circuit and the anomalous segment detection circuit that are to be respectively connected to the segment terminals TSD1 and TSD2 in FIG. 1 will be described as an example, but the segment driving circuit or the anomalous segment detection circuit is to be similarly connected to each of the other segment terminals included in the liquid crystal driver 100. Note that when one segment terminal is connected to one segment electrode such as ESS1, the anomalous segment detection circuit is not provided.

The segment driving circuit 150 outputs a segment driving signal SGQ for driving the segment electrode ESD1 of the liquid crystal panel 200. The segment driving signal SGQ is output to the segment electrode ESD1 from the segment terminal TSD1, which is a first segment terminal. A segment monitoring signal SMN, which is a monitoring signal from the segment electrode ESD1 is input to the segment terminal TSD2, which is a second segment terminal. The anomalous segment detection circuit 160 detects anomalous driving of the segment electrode ESD1 based on the segment monitoring signal SMN.

In this way, even if an anomaly has occurred in the segment signal line LSD1 connected to the segment electrode ESD1, or even if an anomaly has occurred in the segment driving signal SGQ output from the segment driving circuit 150, the anomalous segment detection circuit 160 can detect the anomaly based on the segment monitoring signal SMN.

Also, as a result of detecting anomalous driving using the segment monitoring signal SMN that is fed back from the segment electrode ESD1, anomalous driving can be detected in real time during a normal display operation. For example, a method is conceivable in which a toggle of the segment driving signal SGQ is detected, as a method in which the segment monitoring signal SMN is not used. However, the segment driving signal SGQ may take any waveform in a normal display operation, and therefore, if the segment driving signal SGQ at a low level continues, for example, anomalous driving cannot be detected. Therefore, a special waveform in which the segment driving signal SGQ toggles needs to be input, and as a result, it is difficult to detect anomalous driving in a normal display operation. In the present embodiment, when the segment electrode ESD1 is properly driven, the segment monitoring signal SMN is a signal that is the same as the segment driving signal SGQ, and as a result, anomalous driving can be determined in a normal display operation by detecting the segment monitoring signal SMN.

The segment driving circuit 150 includes a segment signal output circuit 151 that outputs a segment signal SLAT based on the segment driving data ISGDT, and an output circuit 155 that outputs the segment driving signal SGQ based on the segment signal SLAT.

Specifically, the segment signal output circuit 151 includes a polarity inversion circuit 152 and a latch circuit 153. When a voltage is to be applied to a liquid crystal cell corresponding to the segment electrode ESD1, the segment driving data ISGDT is at a high level, and when a voltage is not to be applied to the liquid crystal cell, the segment driving data ISGDT is at a low level. The polarity inversion circuit 152 performs processing to invert the polarity of the segment driving data ISGDT based on a polarity signal POL input from the control circuit 120. That is, the polarity inversion circuit 152 outputs an output signal SGDT at the same logic level as the segment driving data ISGDT in a positive polarity frame, and outputs an output signal SGDT obtained by inverting the logic level of the segment driving data ISGDT in a negative polarity frame. The latch circuit 153 latches the output signal SGDT by a latch pulse LP input from the control circuit 120, and outputs the latched signal as the segment signal SLAT.

The output circuit 155 includes a first level shifter 156 and a buffer circuit 157.

The first level shifter 156 outputs an output signal SLATLS by level-shifting the segment signal SLAT. The control circuit 120, the data storage 130, and the segment signal output circuit 151 operate with a first power supply voltage, and the buffer circuit 157 operates with a second power supply voltage that is different from the first power supply voltage. That is, the first level shifter 156 level-shifts the signal level at the first power supply voltage to a signal level at the second power supply voltage. For example, the second power supply voltage is higher than the first power supply voltage.

The buffer circuit 157 outputs the segment driving signal SGQ based on the output signal SLATLS of the first level shifter 156. That is, the buffer circuit 157 outputs the segment driving signal SGQ by buffering the output signal SLATLS. If the circuit properly operates, the logic level of the segment signal SLAT is the same as the logic level of the segment driving signal SGQ.

The anomalous segment detection circuit 160 detects anomalous driving of the segment electrode ESD1 by comparing the segment monitoring signal SMN, the segment signal SLAT, and the segment driving signal SGQ. The anomalous segment detection circuit 160 includes a second level shifter 161, a third level shifter 162, an exclusive OR circuit 163, and an OR circuit 164.

The second level shifter 161 level-shifts the segment monitoring signal SMN, and outputs a segment monitoring signal SMNLS subjected to level shifting to the exclusive OR circuit 163. The third level shifter 162 level-shifts the segment driving signal SGQ, and outputs a segment driving signal SGQLS subjected to level shifting to the exclusive OR circuit 163. The exclusive OR circuit 163 and the OR circuit 164 operate with the first power supply voltage. That is, the second level shifter 161 and the third level shifter 162 level-shift the signal level at the second power supply voltage to a signal level at the first power supply voltage.

The exclusive OR circuit 163 obtains an exclusive OR of the segment monitoring signal SMNLS subjected to level shifting, the segment signal SLAT, and the segment driving signal SGQLS subjected to level shifting, and outputs a detection signal SDET1, which is the result of the logical operation. If the logic levels of SMNLS, SLAT, and SGQLS match, the detection signal SDET1 is at a low level, and in other cases, the detection signal SDET1 is at a high level. When the segment electrode ESD1 is properly driven, the logic levels of SMNLS, SLAT, and SGQLS match. That is, when anomalous driving is detected, the detection signal SDET1 becomes a high level.

The OR circuit 164 obtains a logical sum of detection signals SDET1 to SDETn, and outputs a detection signal SDETQ, which is the result of the logical operation, to the control circuit 120. n is an integer of two or more. SDET2 to SDETn indicate detection results of anomalous driving of the segment electrodes other than the segment electrode ESD1. When any of SDET1 to SDETn is at a high level, the detection signal SDETQ becomes a high level. When the detection signal SDETQ is at a high level, the control circuit 120 notifies the processing device 400 of the anomalous driving via the interface circuit 110.

Figure 5:
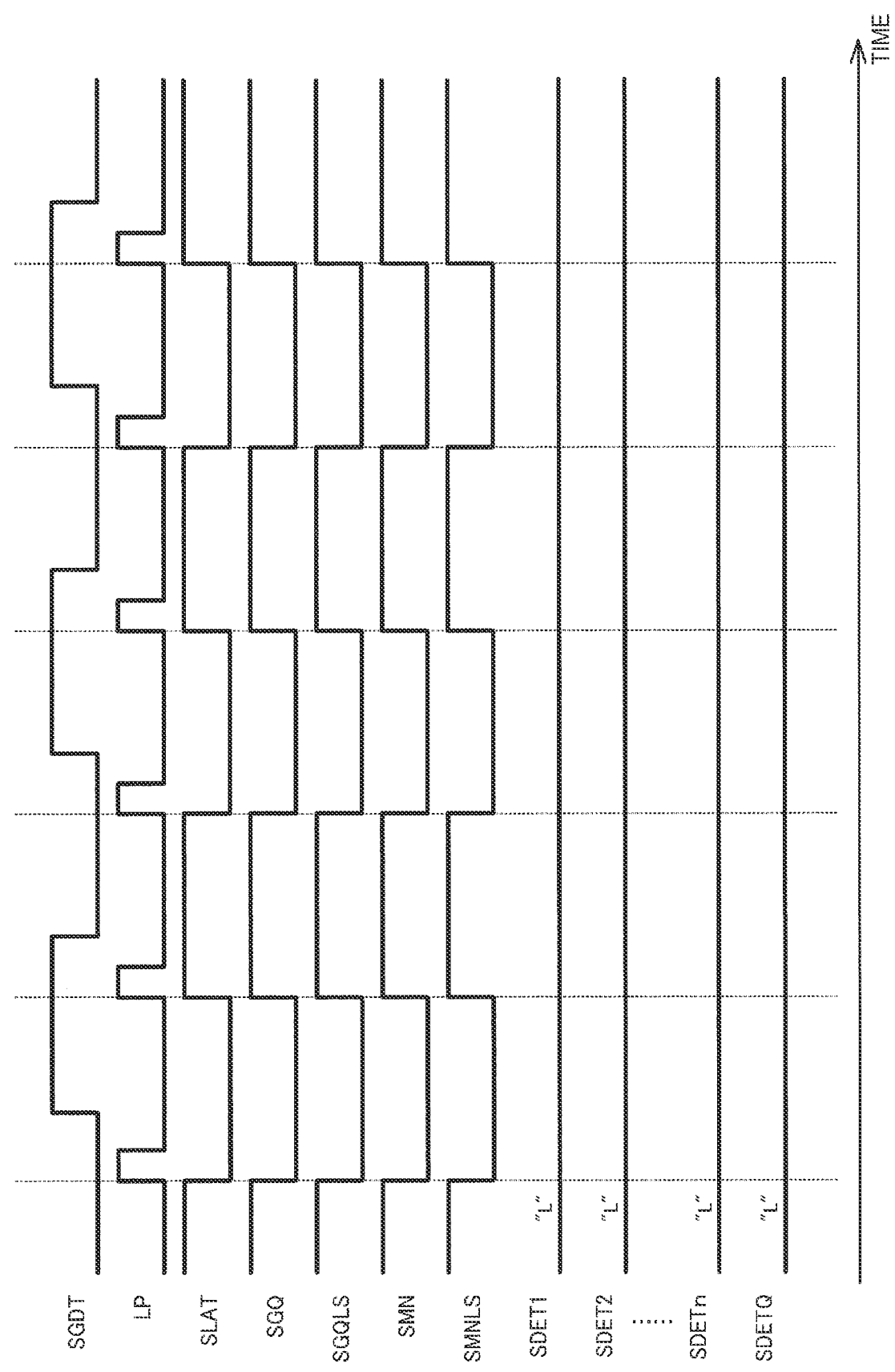
FIG. 5 shows exemplary signal waveforms when segment electrodes are properly driven.

FIG. 5 shows exemplary signal waveforms when the segment electrode ESD1 are properly driven. The latch circuit 153 outputs the segment signal SLAT by latching the output signal SGDT of the polarity inversion circuit 152 at a rising edge of the latch pulse LP. The output circuit 155 outputs the segment driving signal SGQ at the same logic level as the segment signal SLAT. If anomalous driving is not present, the logic level of the segment monitoring signal SMN is the same as the logic level of the segment driving signal SGQ.

From the above, the segment signal SLAT, the segment monitoring signal SMNLS subjected to level shifting, and the segment driving signal SGQLS subjected to level shifting that are input to the exclusive OR circuit 163 are at the same logic level. Therefore, the exclusive OR circuit 163 outputs the detection signal SDET1 at a low level.

Here, the detection signals SDET2 to SDETn are assumed to be at a low level. The OR circuit 164 outputs the detection signal SDETQ at a low level, which is the logical sum of the detection signals SDET1 to SDETn, to the control circuit 120.

Figure 6:
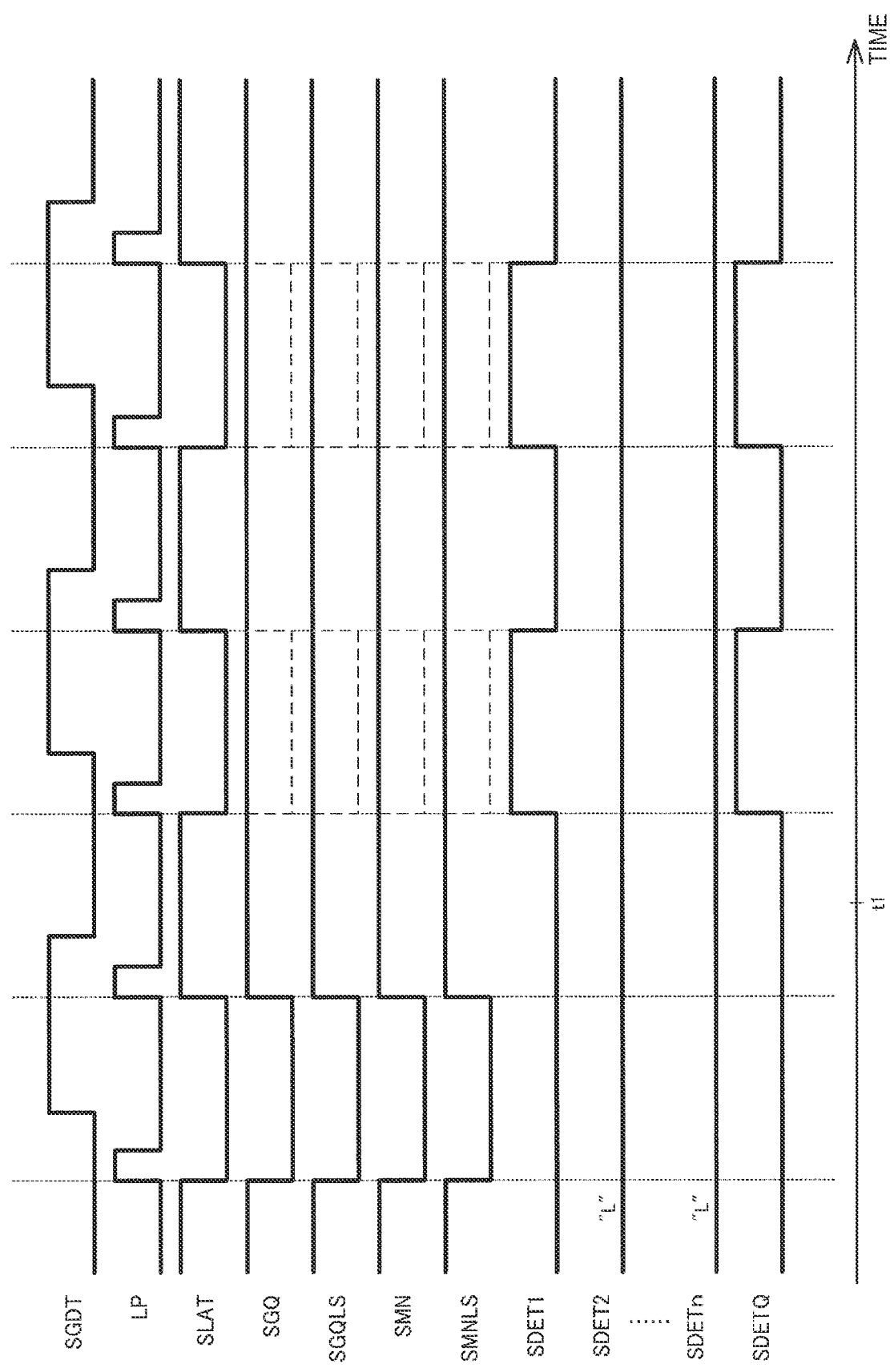
FIG. 6 shows exemplary signal waveforms when a segment signal line is short-circuited to a power supply.

FIG. 6 shows exemplary signal waveforms when the segment signal line LSD1 is short-circuited to a power supply. In FIG. 6, broken line waveforms indicate waveforms when being properly driven, and solid line waveforms indicate waveforms when an anomaly has occurred.

If the segment signal line LSD1 is short-circuited to a power supply at time t1, the segment driving signal SGQ is fixed at a high level after time t1. Although the segment driving signal SGQ should be at a low level when the segment signal SLAT is at a low level, as a result of short-circuiting, the segment driving signal SGQ is at a high level.

As a result of the segment driving signal SGQ being fixed at a high level, the segment driving signal SGQLS subjected to level-shifting, the segment monitoring signal SMN, and the segment monitoring signal SMNLS subjected to level-shifting become high level. Therefore, when the segment signal SLAT is at a low level, the exclusive OR circuit 163 output the detection signal SDET1 at a high level. The OR circuit 164 outputs, when the detection signal SDET1 is at a high level, the detection signal SDETQ at a high level. The control circuit 120, upon receiving the detection signal SDETQ at a high level, determines that anomalous driving has occurred.

Figure 7:
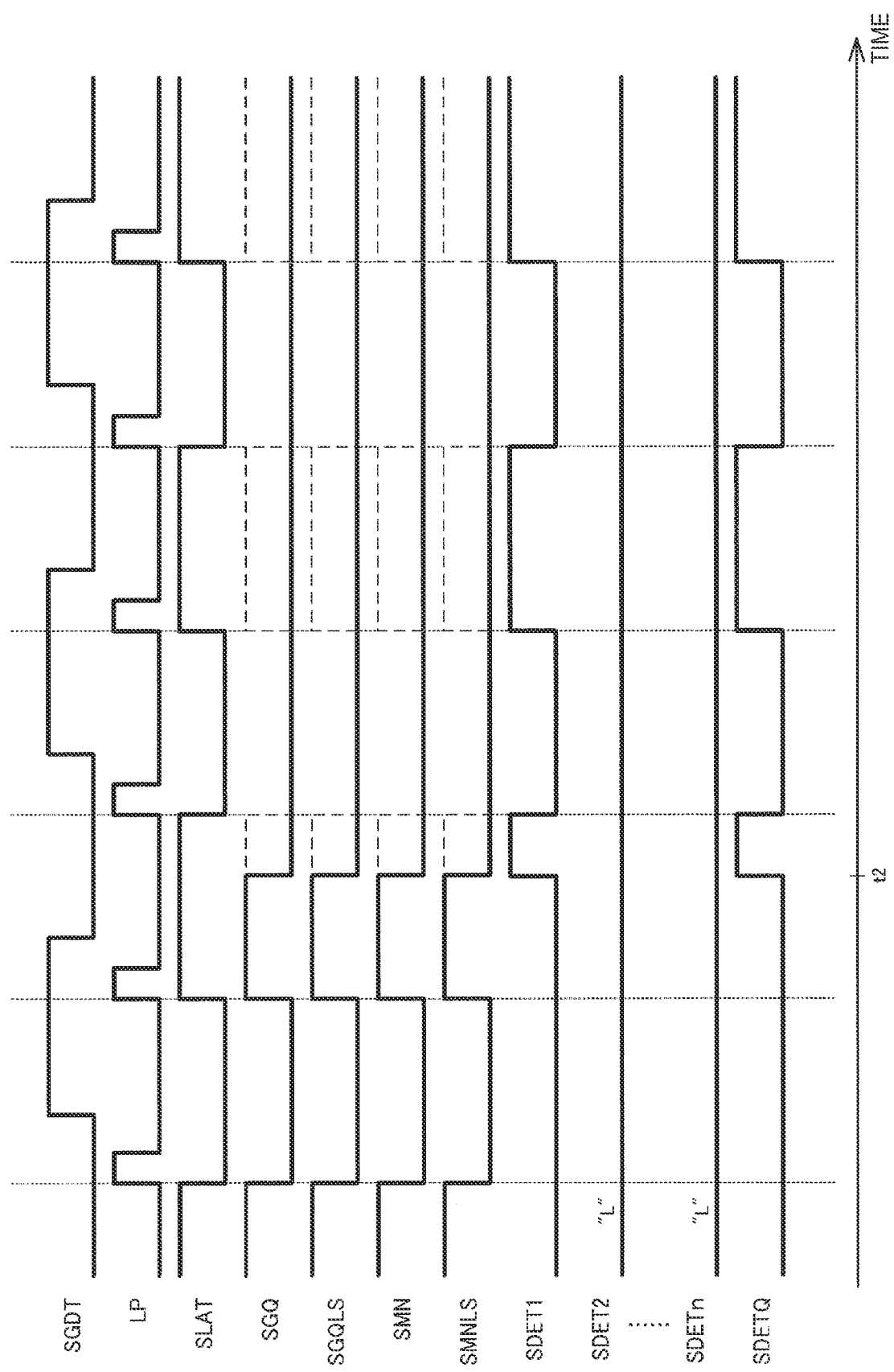
FIG. 7 shows exemplary signal waveforms when a segment signal line is short-circuited to ground.

FIG. 7 shows exemplary signal waveforms when the segment signal line LSD1 is short-circuited to ground. In FIG. 7, broken line waveforms indicate waveforms when being properly driven, and solid line waveforms indicate waveforms when an anomaly has occurred.

If the segment signal line LSD1 is short-circuited to ground at time t2, the segment driving signal SGQ is fixed at a low level after time t2. Although the segment driving signal SGQ should be at a high level when the segment signal SLAT is at a high level, as a result of short-circuiting, the segment driving signal SGQ is at a low level.

As a result of the segment driving signal SGQ being fixed at a low level, the segment driving signal SGQLS subjected to level-shifting, the segment monitoring signal SMN, and the segment monitoring signal SMNLS subjected to level-shifting become low level. Therefore, when the segment signal SLAT is at a high level, the exclusive OR circuit 163 output the detection signal SDET1 at a high level. The OR circuit 164 outputs, when the detection signal SDET1 is at a high level, the detection signal SDETQ at a high level. The control circuit 120, upon receiving the detection signal SDETQ at a high level, determines that anomalous driving has occurred.

Figure 8:
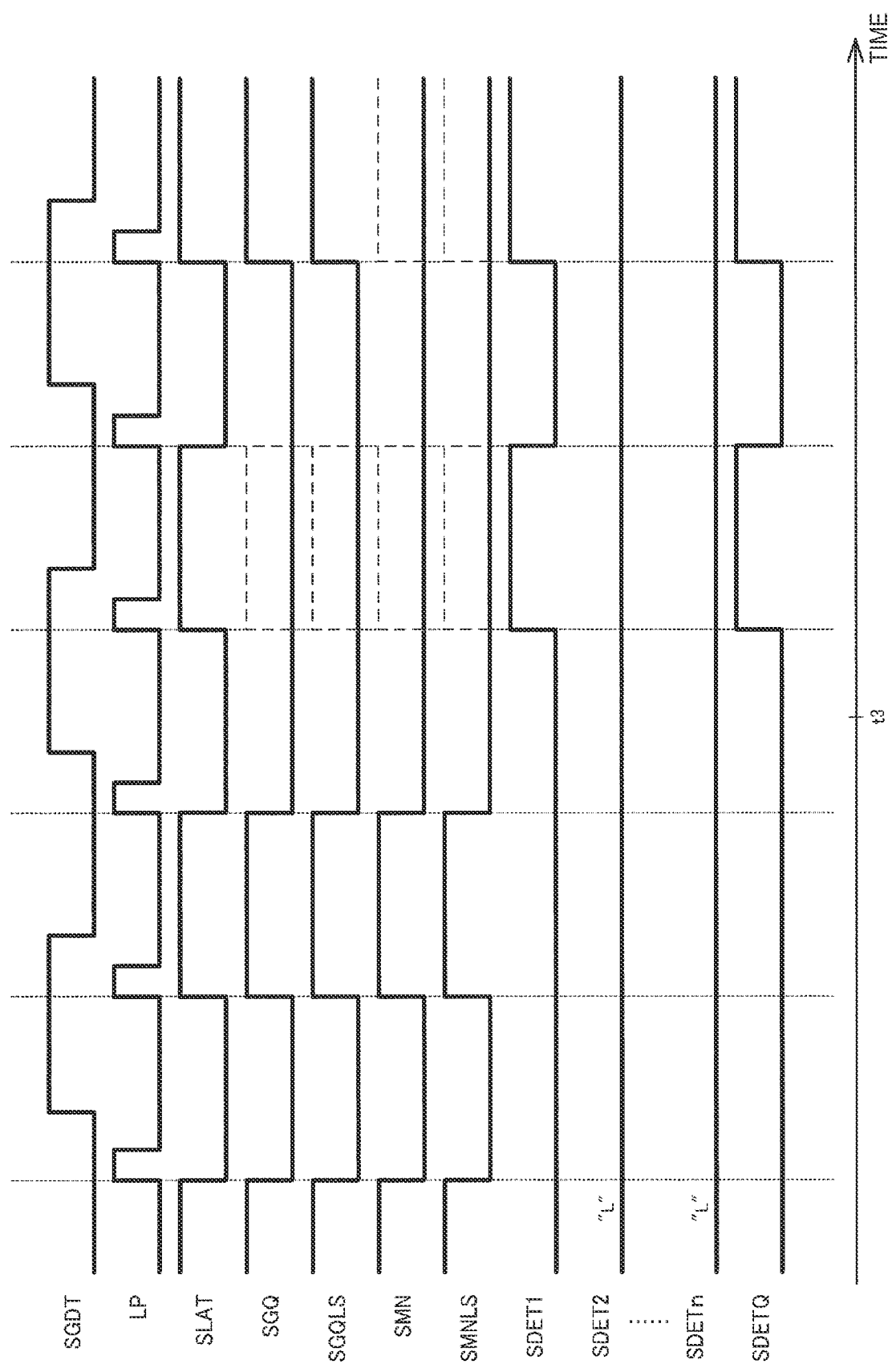
FIG. 8 shows exemplary signal waveforms when connection between a segment terminal and a segment electrode is open.

FIG. 8 shows exemplary signal waveforms when connection between the segment terminal TSD1 and the segment electrode ESD1 is open. The connection being open occurs due to a connection failure of the segment terminal TSD1 or disconnection of the segment signal line LSD1. FIG. 8 shows exemplary signal waveforms when the segment electrode ESD1 is at a ground potential due to charges accumulated in a parasitic capacitance. In FIG. 8, broken line waveforms indicate waveforms when being properly driven, and solid line waveforms indicate waveforms when an anomaly has occurred.

If the connection between the segment terminal TSD1 and the segment electrode ESD1 becomes open at time t3, the segment monitoring signal SMN is fixed at a low level after time t3. Although the segment monitoring signal SMN should be at a high level when the segment driving signal SGQ is at a high level, as a result of the connection being open, the segment monitoring signal SMN is at a low level.

As a result of the segment monitoring signal SMN being fixed at a low level, the segment monitoring signal SMNLS subjected to level-shifting becomes a low level. Therefore, when the segment signal SLAT and the segment driving signal SGQLS subjected to level-shifting are at a high level, the exclusive OR circuit 163 outputs the detection signal SDET1 at a high level. The OR circuit 164 outputs, when the detection signal SDET1 is at a high level, the detection signal SDETQ at a high level. The control circuit 120, upon receiving the detection signal SDETQ at a high level, determines that anomalous driving has occurred.

According to the embodiment described above, as a result of the anomalous segment detection circuit 160 comparing the segment signal SLAT, the segment driving signal SGQ, and the segment monitoring signal SMN, anomalous driving of the segment electrode ESD1 can be detected. That is, when anomalous driving is not present, the logic levels of the segment signal SLAT, the segment driving signal SGQ, and the segment monitoring signal SMN are the same, and therefore, if at least one of the logic levels differs, the anomalous segment detection circuit 160 can detect anomalous driving.

Note that a case has been described where the anomalous segment detection circuit 160 compares the segment signal SLAT, the segment driving signal SGQ, and the segment monitoring signal SMN, in FIGS. 4 to 8, but the configuration may be such as following first and second modifications.

In the first modification, the anomalous segment detection circuit 160 detects anomalous driving of the segment electrode ESD1 by comparing the segment signal SLAT and the segment monitoring signal SMN. In this case, the third level shifter 162 is not provided. Also, the exclusive OR circuit 163 obtains the exclusive OR of the segment signal SLAT and the segment monitoring signal SMNLS subjected to level-shifting, and output the detection signal SDET1, which is the result of the logical operation.

In the second modification, the anomalous segment detection circuit 160 detects anomalous driving of the segment electrode ESD1 by comparing the segment driving signal SGQ and the segment monitoring signal SMN. In this case, the exclusive OR circuit 163 obtains an exclusive OR of the segment driving signal SGQLS subjected to level-shifting and the segment monitoring signal SMNLS subjected to level-shifting, and outputs the detection signal SDET1, which is the result of the logical operation.

Figure 9:
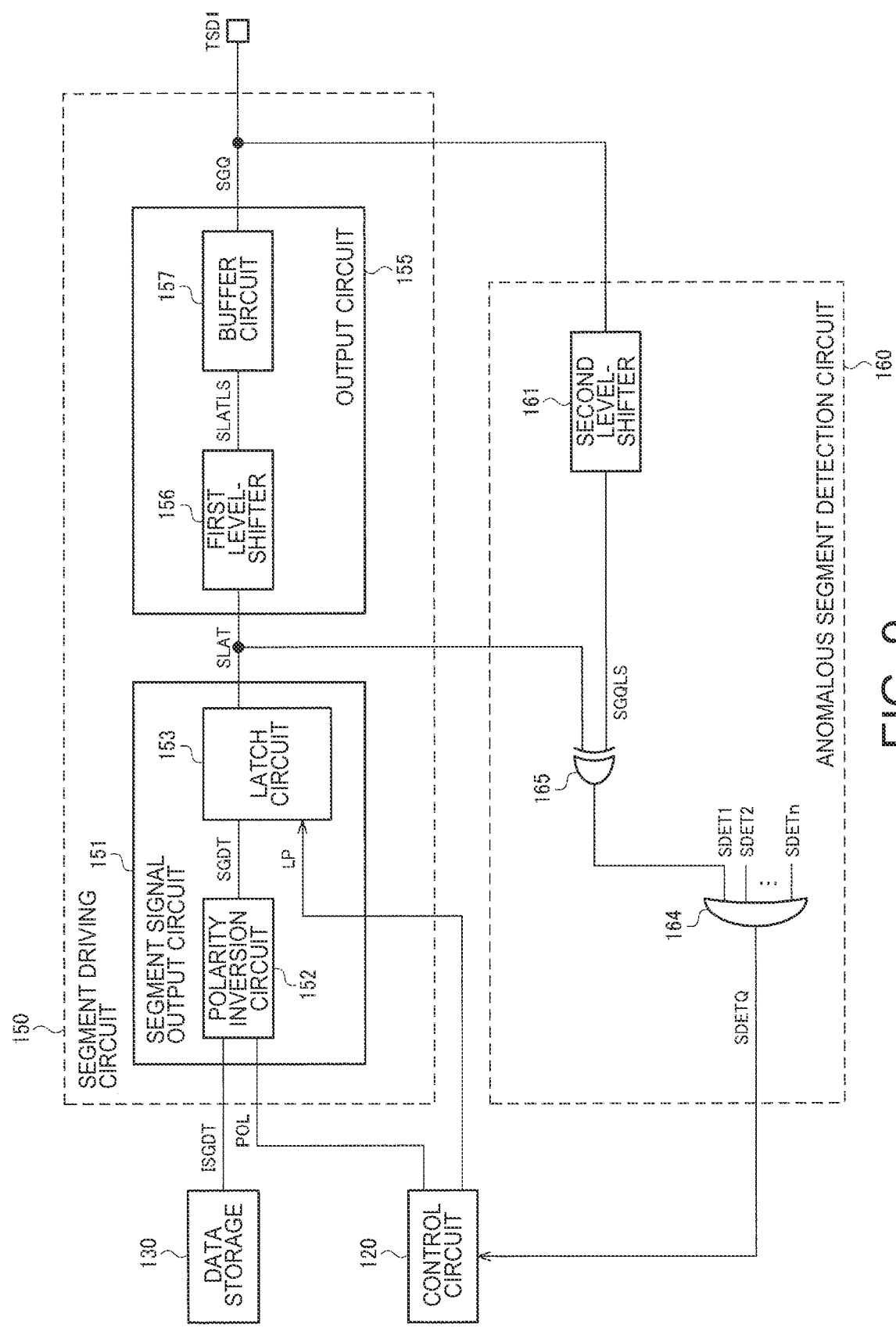
FIG. 9 is a second detailed exemplary configuration of the anomalous segment detection circuit.

FIG. 9 shows a second detailed exemplary configuration of the anomalous segment detection circuit 160. Note that the constituent elements that are the same as the constituent elements that have already been described will be denoted by the same reference signs, and the description thereof will be omitted, as appropriate.

In FIG. 9, the anomalous segment detection circuit 160 detects anomalous driving by comparing the segment signal SLAT and the segment driving signal SGQ. The anomalous segment detection circuit 160 includes a second level shifter 161, an exclusive OR circuit 165, and an OR circuit 164. The exclusive OR circuit 165 obtains an exclusive OR of the segment signal SLAT, and the segment driving signal SGQLS subjected to level-shifting, and outputs the detection signal SDET1, which is the result of the logical operation.

According to the second detailed exemplary configuration, the anomalous segment detection circuit 160 detects an anomaly in the segment driving signal SGQ due to a circuit failure by comparing the segment signal SLAT and the segment driving signal SGQ. Also, anomalous driving is determined based on the result of comparison between the segment signal SLAT and the segment driving signal SGQ, and therefore, even if the segment driving signal SGQ takes any waveform, anomalous driving can be detected. That is, anomalous driving can be detected in real time during a normal display operation.

4. Common Driving Circuit and Anomalous Common Detection Circuit

Figure 10:
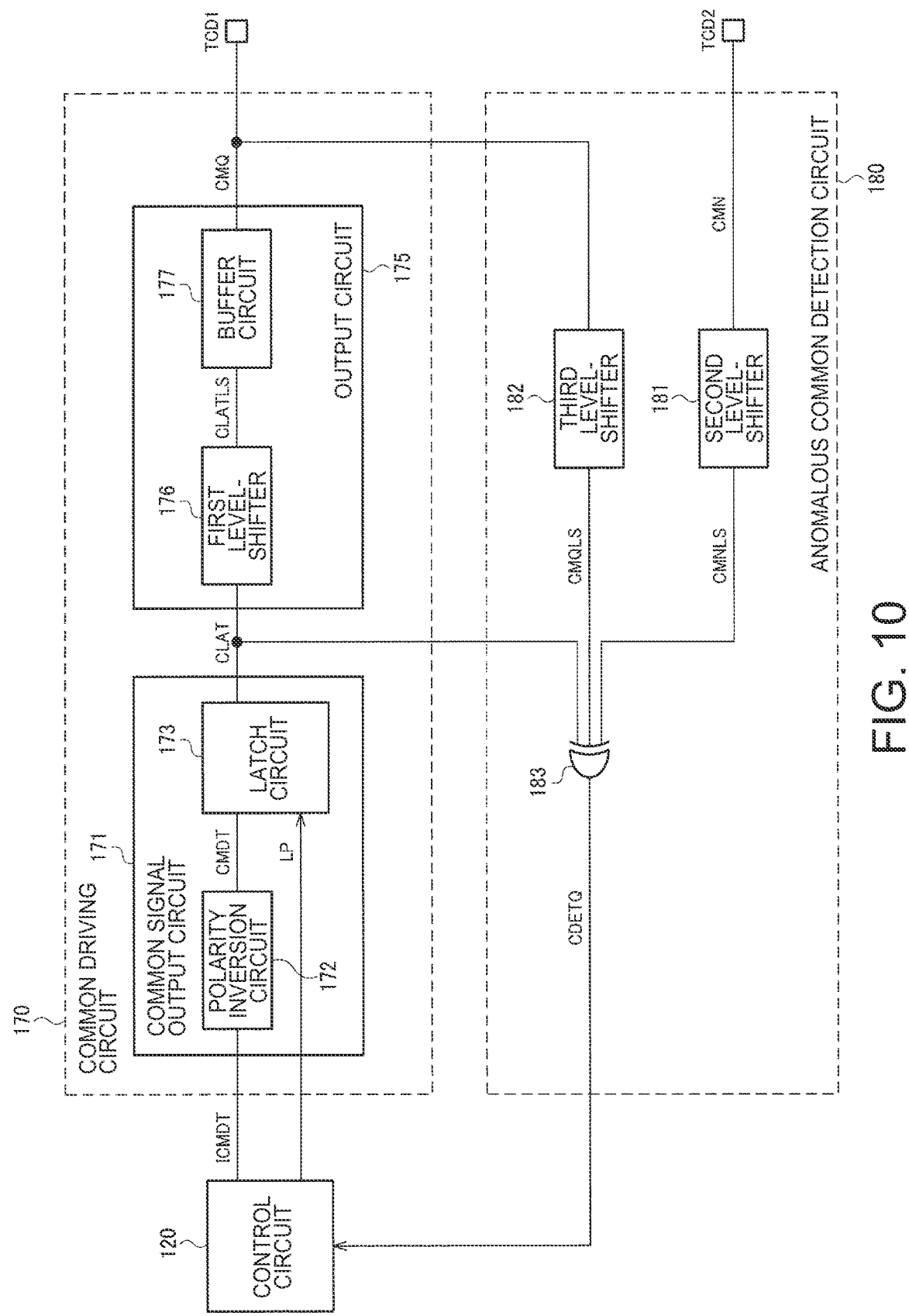
FIG. 10 is a first detailed exemplary configuration of a common driving circuit and an anomalous common detection circuit.

FIG. 10 shows a first detailed exemplary configuration of the common driving circuit 170 and the anomalous common detection circuit 180.

The common driving circuit 170 outputs a common driving signal CMQ for driving the common electrodes of the liquid crystal panel 200. The common driving signal CMQ is output to the common electrodes via the common terminal TCD1, which is a first common terminal. A common monitoring signal CMN, which is a monitoring signal from the common electrodes, is input through the common terminal TCD2, which is a second common terminal. The anomalous common detection circuit 180 detects anomalous driving of the common electrodes based on the common monitoring signal CMN.

In this way, even if an anomaly has occurred in the common signal lines LCD1 to LCD6 that are connected to the common electrodes, or even if an anomaly has occurred in the common driving signal CMQ that the common driving circuit 170 outputs, the anomalous common detection circuit 180 can detect an anomaly based on the common monitoring signal CMN.

Also, as a result of detecting anomalous driving using the common monitoring signal CMN that is fed back from the common electrodes, anomalous driving can be detected in real time during a normal display operation. That is, when the common electrodes are properly driven, the common monitoring signal CMN is a signal that is the same as the common driving signal CMQ, and as a result, anomalous driving can be determined in a normal display operation by detecting the common monitoring signal CMN.

The common driving circuit 170 includes a common signal output circuit 171 that outputs a common signal CLAT based on common driving data ICMDT, and an output circuit 175 that outputs the common driving signal CMQ based on the common signal CLAT.

Specifically, the common signal output circuit 171 includes a polarity inversion circuit 172 and a latch circuit 173. When the display of the liquid crystal panel 200 is turned on, the common driving data ICMDT is at a low level, and when the display of the liquid crystal panel 200 is turned off, the common driving data ICMDT is at a high level. The polarity inversion circuit 172 performs processing to invert the polarity of the common driving data ICMDT. That is, the polarity inversion circuit 172 outputs an output signal CMDT at the same logic level as the common driving data ICMDT in a positive polarity frame, and outputs an output signal CMDT obtained by inverting the logic level of the common driving data ICMDT in a negative polarity frame. The latch circuit 173 latches the output signal CMDT by a latch pulse LP input from the control circuit 120, and outputs the latched signal CMDT as the common signal CLAT.

The output circuit 175 includes a first level shifter 176 and a buffer circuit 177.

The first level shifter 176 outputs an output signal CLATLS by level-shifting the common signal CLAT. The common signal output circuit 171 operates with the first power supply voltage, and the buffer circuit 177 operates with the second power supply voltage. That is, the first level shifter 176 level-shifts the signal level at the first power supply voltage to a signal level at the second power supply voltage.

The buffer circuit 177 outputs the common driving signal CMQ based on the output signal CLATLS of the first level shifter 176. That is, the buffer circuit 177 outputs the common driving signal CMQ by buffering the output signal CLATLS. If the circuit properly operates, the logic level of the common signal CLAT is the same as the logic level of the common driving signal CMQ.

The anomalous common detection circuit 180 detects anomalous driving of the common electrodes by comparing the common monitoring signal CMN, the common signal CLAT, and the common driving signal CMQ. The anomalous common detection circuit 180 includes a second level shifter 181, a third level shifter 182, and an exclusive OR circuit 183.

The second level shifter 181 level-shifts the common monitoring signal CMN, and outputs a common monitoring signal CMNLS subjected to level-shifting to the exclusive OR circuit 183. The third level shifter 182 level-shifts the common driving signal CMQ and outputs a common driving signal CMQLS subjected to level-shifting to the exclusive OR circuit 183. The exclusive OR circuit 183 operates with the first power supply voltage. That is, the second level shifter 181 and the third level shifter 182 level-shift the signal level at the second power supply voltage to a signal level at the first power supply voltage.

The exclusive OR circuit 183 obtains an exclusive OR of the common monitoring signal CMNLS subjected to level-shifting, the common signal CLAT, and the common driving signal CMQLS subjected to level-shifting, and outputs a detection signal CDETQ, which is the result of the logical operation. If the logic levels of CMNLS, CLAT, and CMQLS match, the detection signal CDETQ is at a low level, and in other cases, the detection signal CDETQ is at a high level. When the common electrodes are properly driven, the logic levels of CMNLS, CLAT, and CMQLS match. That is, when anomalous driving is detected, the detection signal CDETQ becomes a high level. When the detection signal CDETQ is at a high level, the control circuit 120 notifies the processing device 400 of the anomalous driving via the interface circuit 110.

Figure 11:
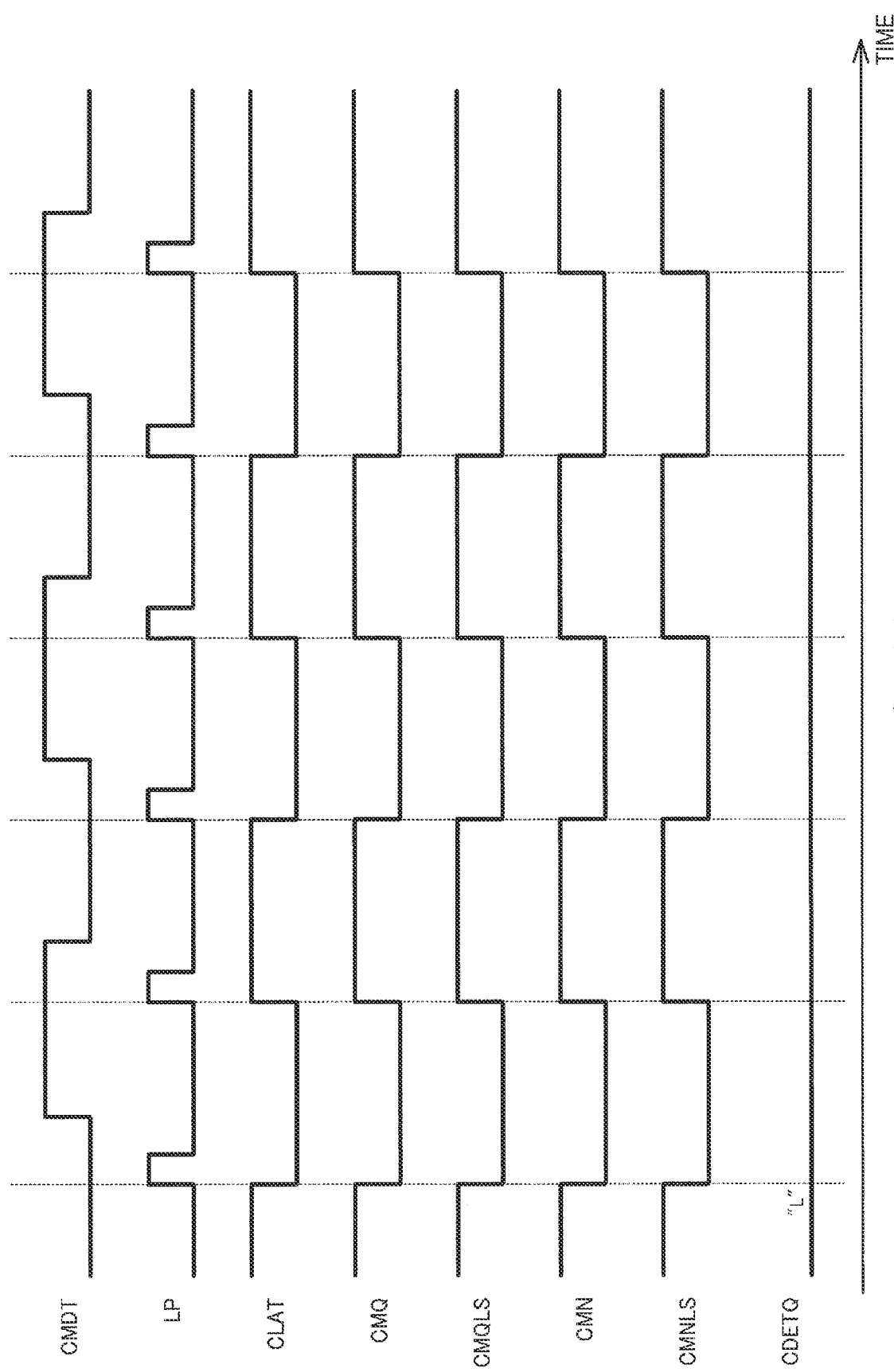
FIG. 11 shows exemplary signal waveforms when a common electrode is properly driven.

FIG. 11 shows exemplary signal waveforms when the common electrodes are properly driven. The latch circuit 173 latches the output signal CMDT of the polarity inversion circuit 172 at the rising edge of the latch pulse LP, and outputs the latched signal as the common signal CLAT. The output circuit 175 outputs the common driving signal CMQ at the same logic level as the common signal CLAT. When anomalous driving is not present, the logic level of the common monitoring signal CMN is the same as the logic level of the common driving signal CMQ.

From the above, the common signal CLAT, the common monitoring signal CMNLS subjected to level-shifting, and the common driving signal CMQLS subjected to level-shifting that are input to the exclusive OR circuit 183 are at the same logic level. Therefore, the exclusive OR circuit 183 outputs a detection signal CDETQ at a low level to the control circuit 120.

Figure 12:
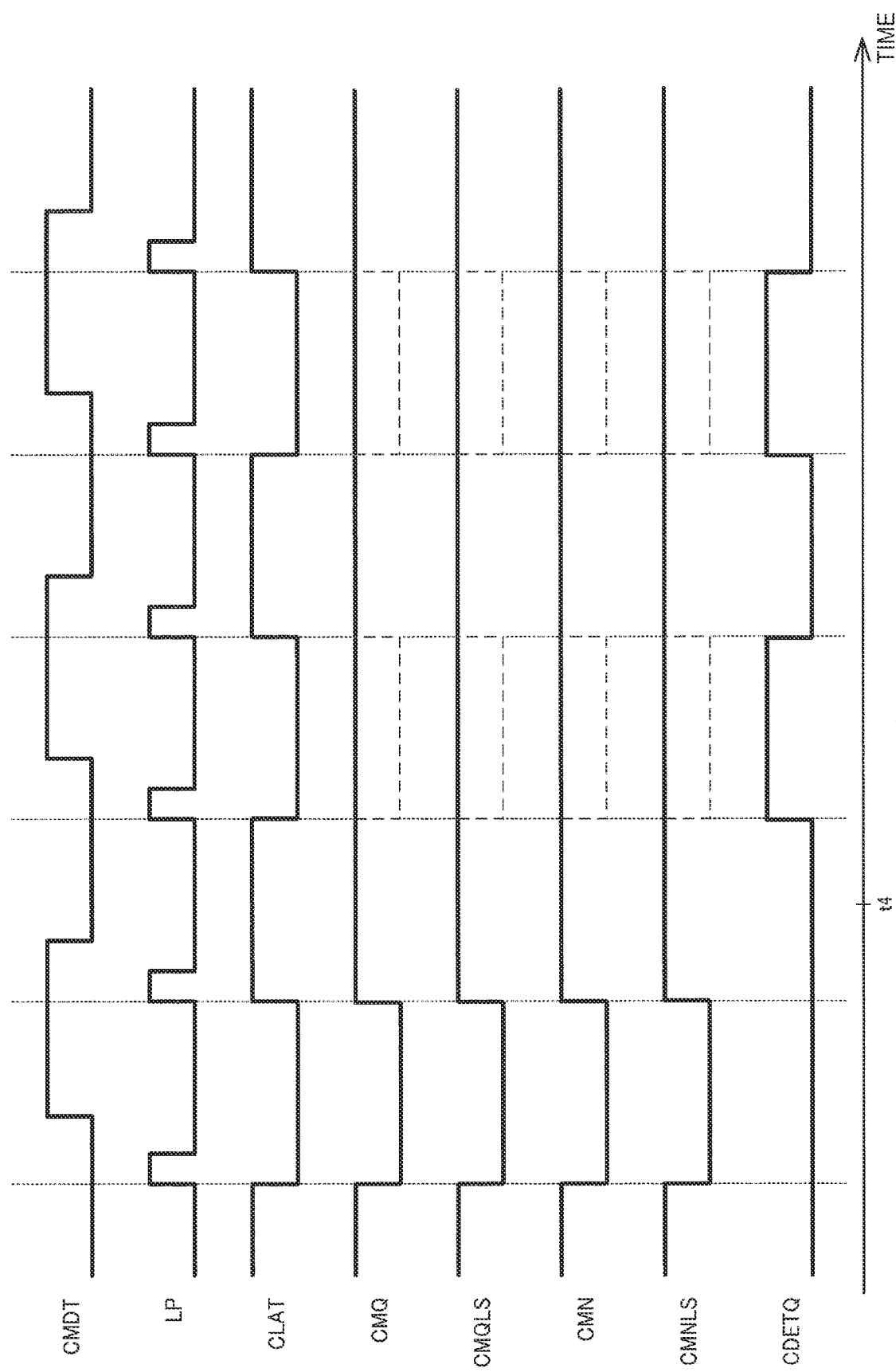
FIG. 12 shows exemplary signal waveforms when any of common signal lines is short-circuited to the power supply.

FIG. 12 shows exemplary signal waveforms when any of the common signal lines LCD1 to LCD6 is short-circuited to a power supply. In FIG. 12, broken line waveforms indicate waveforms when being properly driven, and solid line waveforms indicate waveforms when an anomaly has occurred.

If any of the common signal lines LCD1 to LCD6 is short-circuited to the power supply at a time t4, the common driving signal CMQ is fixed at a high level after time t4. That is, even if the common signal CLAT is at a low level, the common driving signal CMQ is at a high level. Here, the exclusive OR circuit 183 outputs the detection signal CDETQ at a high level. Upon receiving the detection signal CDETQ at a high level, the control circuit 120 determines that anomalous driving has occurred.

Figure 13:
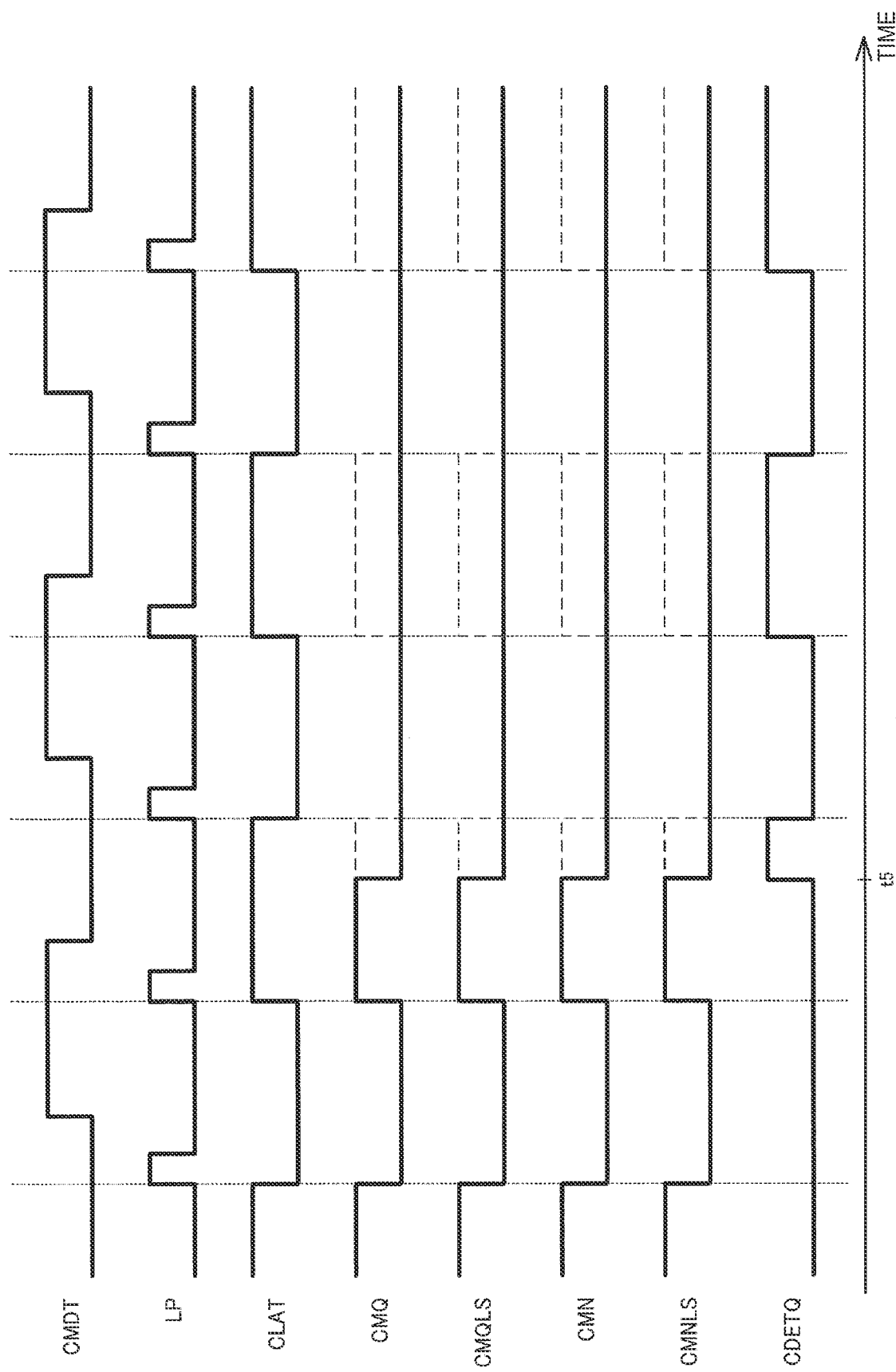
FIG. 13 shows exemplary signal waveforms when any of the common signal lines is short-circuited to ground.

FIG. 13 shows exemplary signal waveforms when any of the common signal lines LCD1 to LCD6 is short-circuited to ground. In FIG. 13, broken line waveforms indicate waveforms when being properly driven, and solid line waveforms indicate waveforms when an anomaly has occurred.

If any of the common signal lines LCD1 to LCD6 is short-circuited to ground at time t5, the common driving signal CMQ is fixed at a low level after time t5. That is, even if the common signal CLAT is at a high level, the common driving signal CMQ is at a low level. Here, the exclusive OR circuit 183 outputs the detection signal CDETQ at a high level. Upon receiving the detection signal CDETQ at a high level, the control circuit 120 determines that anomalous driving has occurred.

Figure 14:
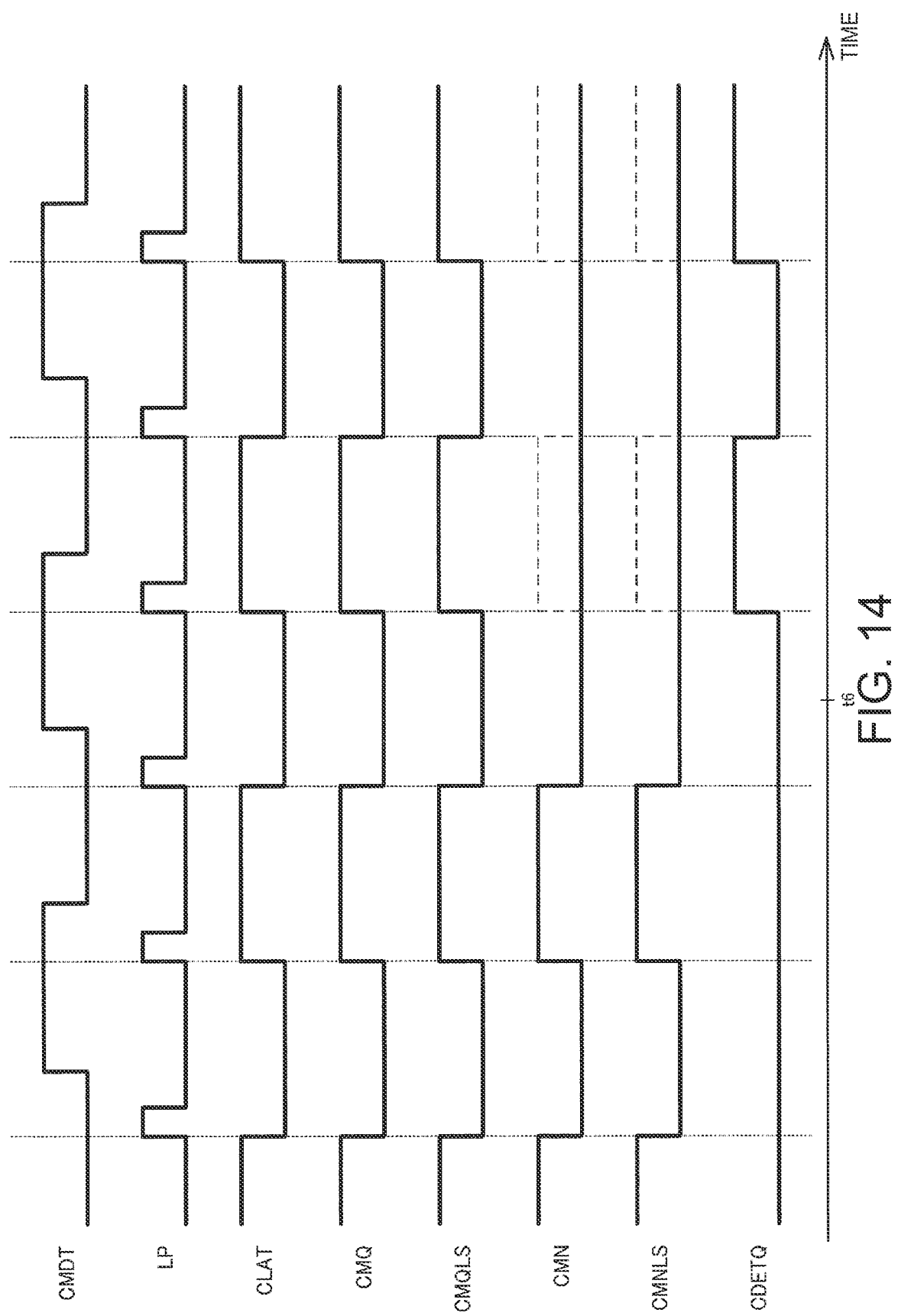
FIG. 14 shows exemplary signal waveforms when the connection between a common terminal and a common electrode is open.

FIG. 14 shows exemplary signal waveforms when the connection between the common terminal TCD1 and the common electrodes is open. The connection being open occurs due to a connection failure of the common terminal TCD1 or disconnection of any of the common signal lines LCD1 to LCD6. FIG. 13 shows exemplary signal waveforms when the common electrodes are at a ground potential due to charges accumulated in a parasitic capacitance. In FIG. 13, broken line waveforms indicate waveforms when being properly driven, and solid line waveforms indicate waveforms when an anomaly has occurred.

If the connection between the common terminal TCD1 and the common electrodes becomes open at time t6, the common monitoring signal CMN is fixed at a low level after time t6. That is, even if the common driving signal CMQ is at a high level, the common monitoring signal CMN is at a low level. Here, the exclusive OR circuit 183 outputs the detection signal CDETQ at a high level. Upon receiving the detection signal CDETQ at a high level, the control circuit 120 determines that anomalous driving has occurred.

According to the embodiment described above, the anomalous common detection circuit 180 can detect anomalous driving of the common electrodes by comparing the common signal CLAT, the common driving signal CMQ, and the common monitoring signal CMN. That is, when anomalous driving is not present, the logic levels of the common signal CLAT, the common driving signal CMQ, and the common monitoring signal CMN are the same, and therefore, if at least one of the logic levels differs, the anomalous common detection circuit 180 can detect anomalous driving.

Note that a case has been described where the anomalous common detection circuit 180 compares the common signal CLAT, the common driving signal CMQ, and the common monitoring signal CMN, in FIGS. 10 to 14, but the configuration may be such as following first and second modifications.

In the first modification, the anomalous common detection circuit 180 detects anomalous driving of the common electrodes by comparing the common signal CLAT and the common monitoring signal CMN. In this case, the third level shifter 182 is not provided. Also, the exclusive OR circuit 183 obtains an exclusive OR of the common signal CLAT and the common monitoring signal CMNLS subjected to level-shifting, and outputs the detection signal CDETQ, which is the result of the logical operation.

In the second modification, the anomalous common detection circuit 180 detects anomalous driving of the common electrodes by comparing the common driving signal CMQ and the common monitoring signal CMN. In this case, the exclusive OR circuit 183 obtains an exclusive OR of the common driving signal CMQLS subjected to level-shifting and the common monitoring signal CMNLS subjected to level-shifting, and outputs the detection signal CDETQ, which is the result of the logical operation.

Figure 15:
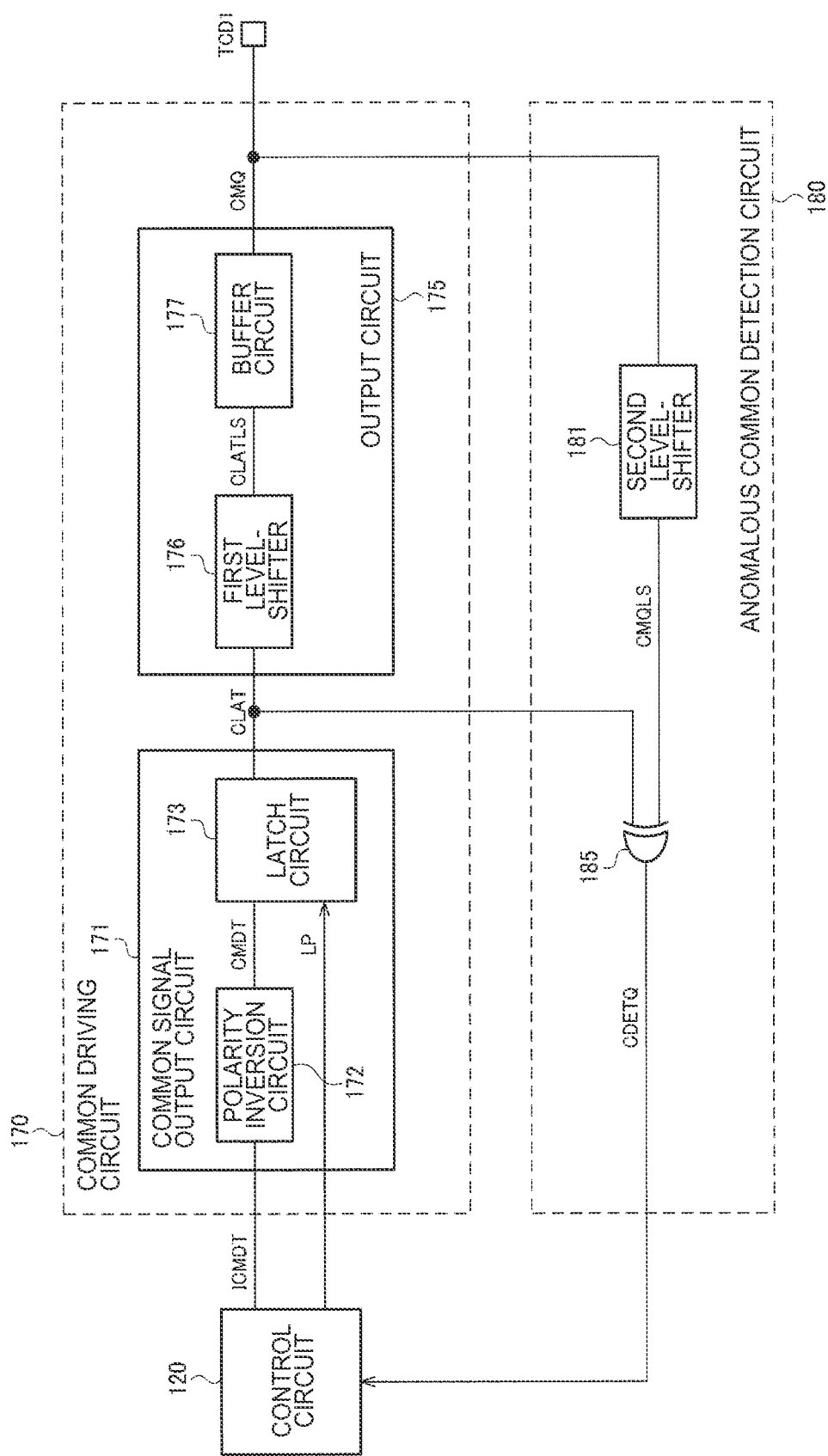
FIG. 15 is a second detailed exemplary configuration of the anomalous common detection circuit.

FIG. 15 shows a second detailed exemplary configuration of the anomalous common detection circuit 180. Note that the constituent elements that are the same as those in FIG. 10 will be denoted by the same reference signs, and the description thereof will be omitted, as appropriate.

In FIG. 15, the anomalous common detection circuit 180 detects anomalous driving by comparing the common signal CLAT and the common driving signal CMQ. The anomalous common detection circuit 180 includes a second level shifter 181 and an exclusive OR circuit 185. The exclusive OR circuit 185 obtains an exclusive OR of the common signal CLAT and the common driving signal CMQLS subjected to level-shifting, and outputs the detection signal CDETQ, which is the result of the logical operation.

According to the second detailed exemplary configuration, the anomalous common detection circuit 180 can detect an anomaly in the common driving signal CMQ due to a circuit failure by comparing the common signal CLAT and the common driving signal CMQ. Also, anomalous driving is determined based on the result of comparison between the common signal CLAT and the common driving signal CMQ, and therefore, even if the common driving signal CMQ takes any waveform, anomalous driving can be detected. That is, anomalous driving can be detected in real time during a normal display operation.

5. Switching to Dual-Line Output

Next, a method of outputting, after anomalous driving of a segment electrode has been detected, a segment driving signal to the segment electrode from two segment terminals will be described.

Figure 16:
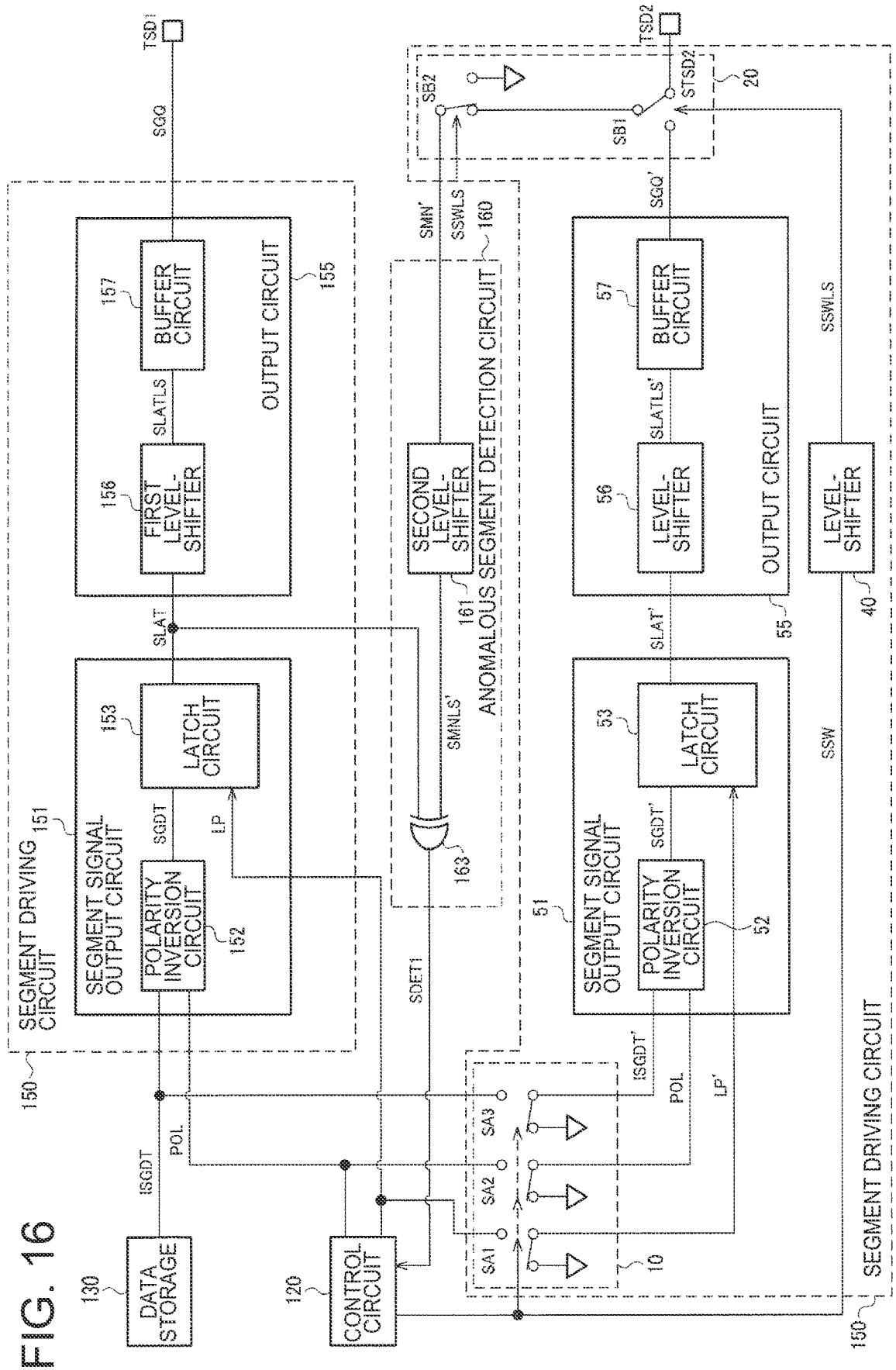
FIG. 16 is a third detailed exemplary configuration of the segment driving circuit and the anomalous segment detection circuit.
Figure 17:
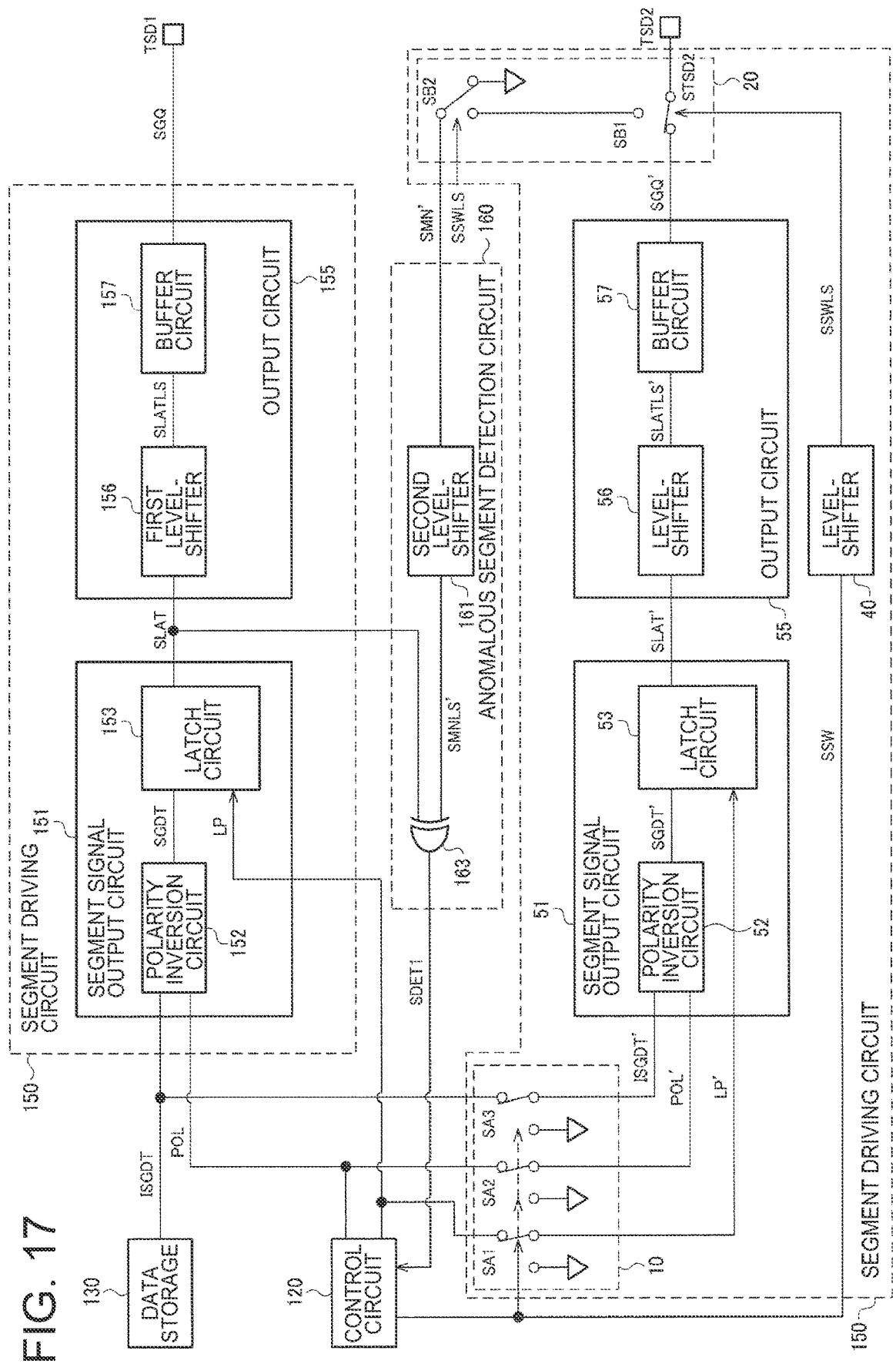
FIG. 17 is a third detailed exemplary configuration of the segment driving circuit and the anomalous segment detection circuit.

FIGS. 16 and 17 show a third detailed exemplary configuration of the segment driving circuit 150 and the anomalous segment detection circuit 160. Note that, in FIGS. 16 and 17, the segment driving circuit and the anomalous segment detection circuit that are to be respectively connected to the segment terminals TSD1 and TSD2 in FIG. 1 will be described as an example, but the segment driving circuit or the anomalous segment detection circuit are to be similarly connected to each of the other segment terminals included in the liquid crystal driver 100. Note that when one segment terminal is connected to one segment electrode such as ESS1, the anomalous segment detection circuit and a later-described switch circuit are not provided.

When anomalous driving of the segment electrode ESD1 has been detected, the segment driving circuit 150 outputs a segment driving signal SGQ' for driving the segment electrode ESD1 separately from the segment driving signal SGQ to the segment terminal TSD2. Note that the segment driving signal SGQ is a first segment driving signal, and the segment driving signal SGQ' is a second segment driving signal.

In this way, when anomalous driving has occurred due to disconnection of the segment signal line LSD1 as indicated by A1 in FIG. 1 or the like, the segment driving signal SGQ' can be output to the segment electrode ESD1 from the segment terminal TSD2 via the segment signal line LSD2. With this, even if anomalous driving has occurred, the segment electrode ESD1 can be continuously driven, and the display can be continued.

Specifically, the segment driving circuit 150 includes the segment signal output circuit 151, the output circuit 155, a segment signal output circuit 51, a driving circuit 55, switch circuits 10 and 20, and a level-shifter 40. The segment signal output circuit 151 and the output circuit 155 are similar to those in FIG. 4, and therefore the description thereof will be omitted.

The segment signal output circuit 51 includes a polarity inversion circuit 52 and a latch circuit 53. The driving circuit 55 includes a level-shifter 56 and an output circuit 57. The operations of the segment signal output circuit 51 and the driving circuit 55 are similar to those of the segment signal output circuit 151 and the output circuit 155. That is, a polarity signal POL' and a segment driving data ISGDT' are input to the polarity inversion circuit 52 from the switch circuit 10. The polarity inversion circuit 52 performs processing to invert the polarity of the segment driving data ISGDT' based on the polarity signal POL'. A latch pulse LP' is input to the latch circuit 153 from the switch circuit 10. The latch circuit 53 latches the output signal SGDT' of the polarity inversion circuit 52 by the latch pulse LP', and outputs the latched signal as the segment signal SLAT'. The level-shifter 56 level-shifts the segment signal SLAT'. The output circuit 57 outputs the segment driving signal SGQ' based on the output signal SLATLS' of the level-shifter 56.

The control circuit 120 outputs a switch control signal SSW based on the detection signal SDET1. The state of the switch circuit shown in FIG. 16 is referred to as a monitoring state, and the state of the switch circuit shown in FIG. 17 is referred to as a dual-line driving state. When anomalous driving of the segment electrode is not detected, the control circuit 120 outputs the switch control signal SSW for instructing the monitoring state. When anomalous driving of the segment electrode has been detected, the control circuit 120 outputs the switch control signal SSW for instructing the dual-line driving state.

The level-shifter 40 outputs the switch control signal SSWLS subjected to level-shifting by level-shifting the switch control signal SSW. The level-shifter 40 level-shifts the signal level at the first power supply voltage to a signal level at the second power supply voltage.

The switch circuit 10 includes switches SA1 to SA3. The switches SA1 to SA3 are controlled to be in the monitoring state or the dual-line driving state by the switch control signal SSW. In the monitoring state, the switch SA1 selects LP'=L, the switch SA2 selects POL'=L, and the switch SA3 selects ISGDT'=L. "L" indicates a low level. In the dual-line driving state, the switch SA1 selects LP'=LP, the switch SA2 selects POL'=POL, and the switch SA3 selects ISGDT'=ISGDT. The switches SA1 to SA3 are constituted by transistors, for example.

The switch circuit 20 includes switches SB1 and SB2. The switches SB1 and SB2 are controlled to be in the monitoring state or in the dual-line driving state by the switch control signal SSWLS. The signal at the segment terminal TSD2 is denoted as STSD2. In the monitoring state, the switch SB1 and the switch SB2 select SMN'=STSD2. With this, the segment monitoring signal is input to the anomalous segment detection circuit 160. In the dual-line driving state, the switch SB2 selects SMN'=L, and the switch SB1 selects STSD2=SGQ'. With this, the segment driving signal SGQ' is output from the segment terminal TSD2. The switches SB1 and SB2 are constituted by transistors, for example.

The anomalous segment detection circuit 160 includes the second level shifter 161 and the exclusive OR circuit 163. The second level shifter 161 level-shifts the segment monitoring signal SMN'. The exclusive OR circuit 163 obtains an exclusive OR of the segment signal SLAT and the segment monitoring signal SMN' subjected to level-shifting, and outputs the detection signal SDET1, which is the result of logical operation.

Note that the anomalous segment detection circuit 160 may detect anomalous driving of the segment electrode by comparing the segment signal, the segment driving signal, and the segment monitoring signal. In this case, the anomalous segment detection circuit 160 further includes a level-shifter that level-shifts the segment driving signal SGQ. Also, the exclusive OR circuit 163 obtains an exclusive OR of the segment signal SLAT, the segment driving signal subjected to level-shifting, and the segment monitoring signal SMN' subjected to level-shifting.

Figure 18:
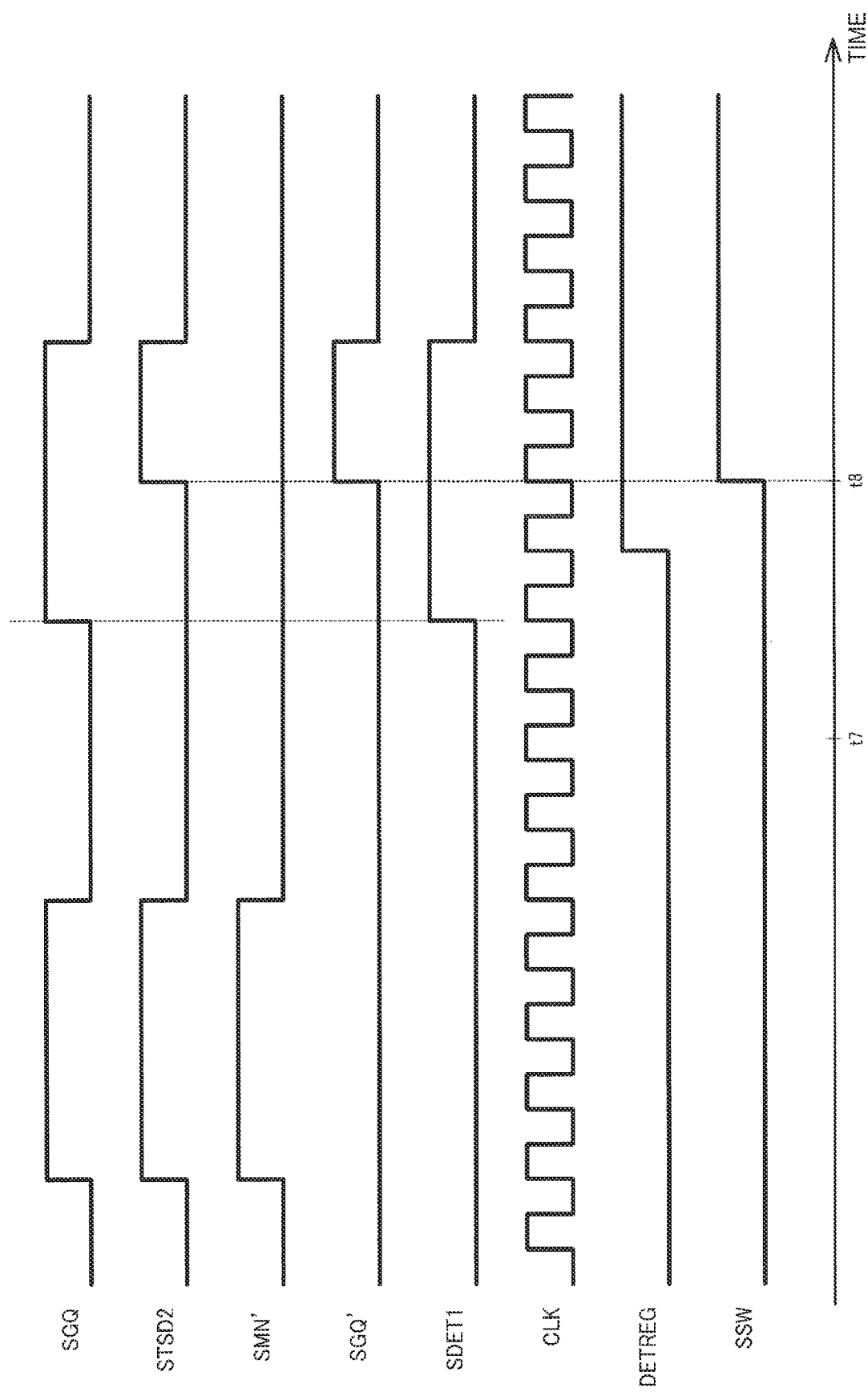
FIG. 18 shows exemplary signal waveforms illustrating operations of the third detailed exemplary configuration.

FIG. 18 shows exemplary signal waveforms for illustrating operations of the third detailed exemplary configuration. In FIG. 18, a period in which SSW=L is in the monitoring state, and a period in which SSW=H is in the dual-line driving state.

In the monitoring state, the segment monitoring signal is fed back to the segment terminal TSD2. Also, the signal STSD2 at the segment terminal TSD2 is input to the anomalous segment detection circuit 160 as the segment monitoring signal SMN'. When anomalous driving is not present, the segment monitoring signal SMN' is at the same logic level as the segment driving signal SGQ.

Assume that anomalous driving has occurred at time t7. Here, assume that the segment signal line is short-circuited to ground. After anomalous driving has occurred, even if the segment driving signal SGQ is at a high level, the segment monitoring signal SMN' is at a low level. Therefore, the detection signal SDET1 becomes a high level, and anomalous driving is detected.

CLK indicates an operation clock signal of the control circuit 120. The clock signal CLK is input to the control circuit 120 from the oscillator circuit 190 in FIG. 3. The control circuit 120 includes a register, and the register fetches the detection signal SDET1 at the rising edge of the clock signal CLK. DETREG indicates the output signal of the register.

The control circuit 120 latches the output signal DETREG of the register at the rising edge of the clock signal, and outputs the switch control signal SSW. With this, the switch control signal SSW transitions from a low level to a high level at time t8. The dual-line driving state is entered after time t8.

In the dual-line driving state, the signal STSD2 at the segment terminal TSD2 is at the same logic level as the segment driving signal SGQ'. That is, the segment driving signal SGQ' is output to the segment electrode ESD1 from the segment terminal TSD2. The segment driving signal SGQ' in the dual-line driving state is at the same logic level as the segment driving signal SGQ.

Figure 19:
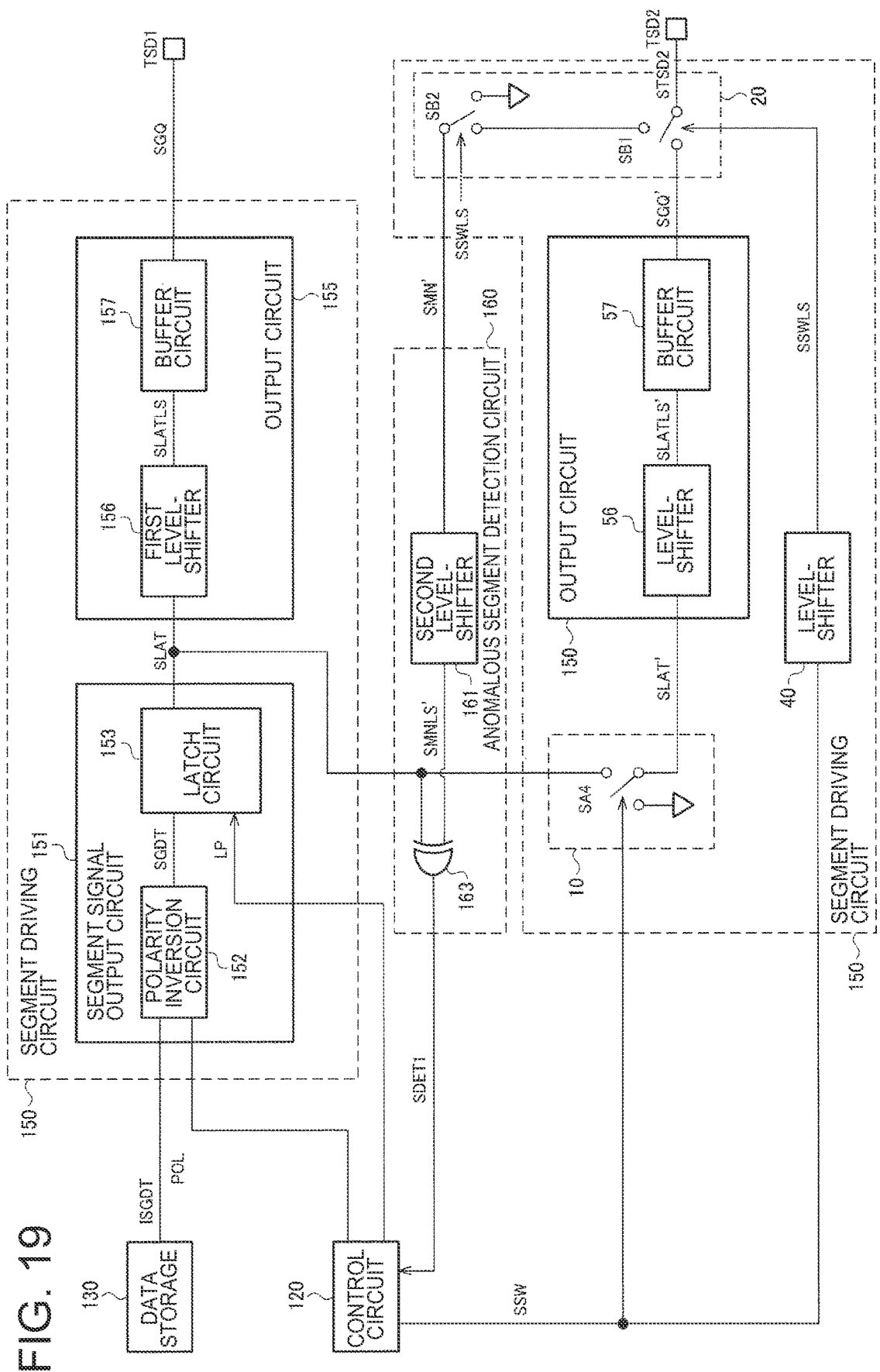
FIG. 19 is a fourth detailed exemplary configuration of the segment driving circuit and the anomalous segment detection circuit.

FIG. 19 is a fourth detailed exemplary configuration of the segment driving circuit 150 and the anomalous segment detection circuit 160. In FIG. 19, the segment signal output circuit 51 in FIG. 16 is omitted, and the switch circuit 10 is configured to switch the segment signal SLAT'. Note that the constituent elements that are the same as the constituent elements that have already been described will be denoted by the same reference signs, and the description thereof will be omitted, as appropriate.

The switch circuit 10 includes a switch SA4. In the monitoring state in which SSW=L, the switch SA4 selects SLAT'=L. In the dual-line driving state in which SSW=H, the switch SA4 selects SLAT'=SLAT. The signal waveforms in the fourth detailed exemplary configuration are similar to those in FIG. 18.

Figure 20:
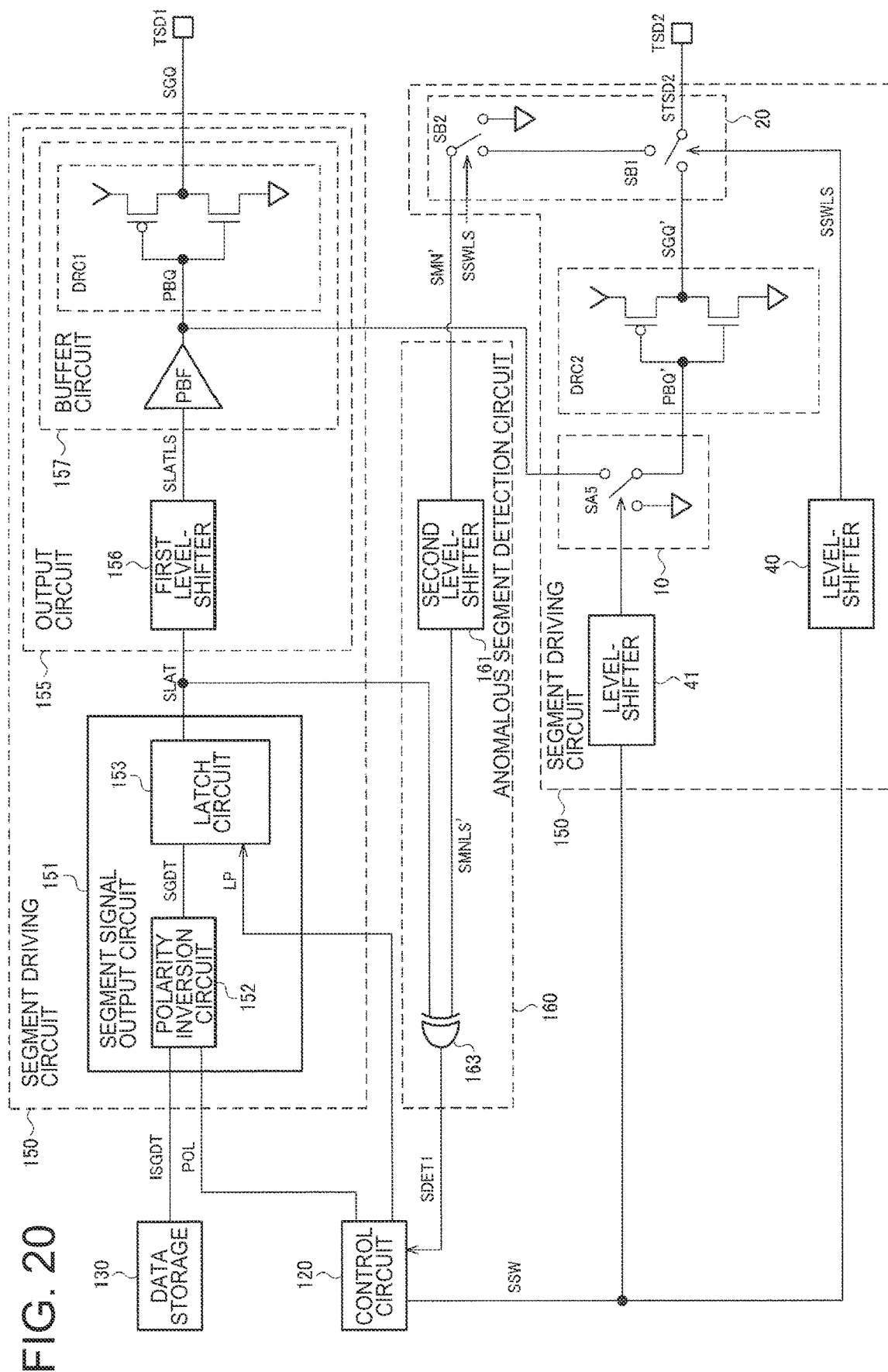
FIG. 20 is a fifth detailed exemplary configuration of the segment driving circuit and the anomalous segment detection circuit.

FIG. 20 is a fifth detailed exemplary configuration of the segment driving circuit 150 and the anomalous segment detection circuit 160. In FIG. 20, the segment driving circuit 150 includes the segment signal output circuit 151, the output circuit 155, level-shifters 40 and 41, and an output driver DRC2. Also, the buffer circuit 157 of the output circuit 155 includes a pre-buffer PBF and an output driver DRC1. Also, the switch circuit 10 is configured to switch an input signal PBQ' to the output driver DRC2. Note that the constituent elements that are the same as the constituent elements that have already been described will be denoted by the same reference signs, and the description thereof will be omitted, as appropriate.

The pre-buffer PBF drives the output driver DRC1 by buffering the output signal SLATLS of the first level shifter 156. Also, in the dual-line driving state, the pre-buffer PBF drives the output drivers DRC1 and DRC2. The output driver DRC1 outputs the segment driving signal SGQ based on an output signal PBQ of the pre-buffer PBF. The output driver DRC2 outputs the segment driving signal SGQ' based on the input signal PBQ' selected by the switch circuit 10. The output drivers DRC1 and DRC2 are drivers configured to be an inverter formed by a P-type transistor and an N-type transistor.

The switch circuit 10 includes a switch SA5. The level-shifter 41 level-shifts the switch control signal SSW, and output a switch control signal subjected to level-shifting to the switch SA5. The level-shifter 41 level-shifts the signal level at the first power supply voltage to a signal level at the second power supply voltage. Note that the level-shifter 40 may output the switch control signal SSWLS to the switch SA5 without providing the level-shifter 41. In the monitoring state in which SSW=L, the switch SA5 selects PBQ'=L. In the dual-line driving state in which SSW=H, the switch SA5 selects PBQ'=PBQ. The signal waveforms in the fifth detailed exemplary configuration are similar to those in FIG. 18.

Figure 21:
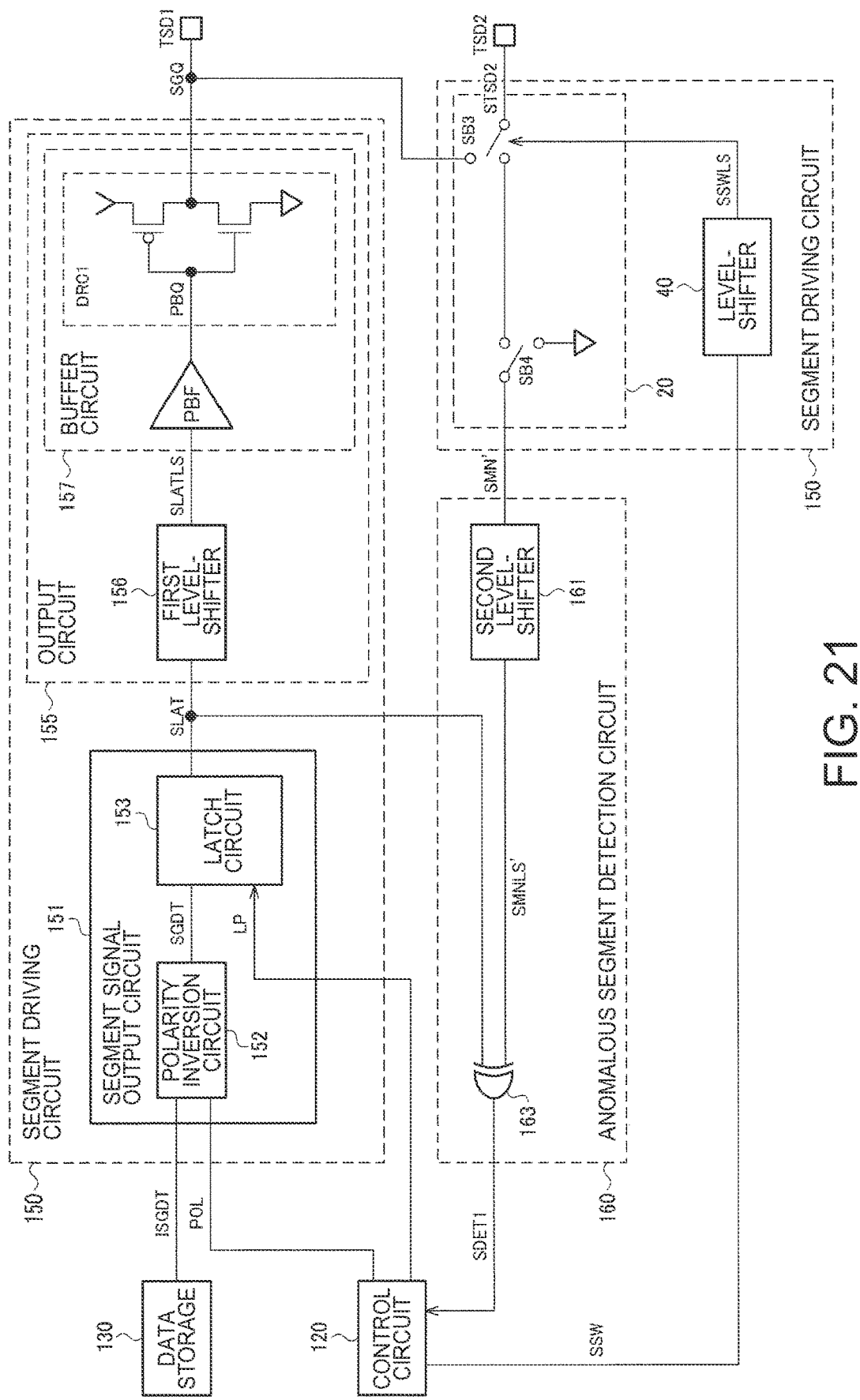
FIG. 21 is a sixth detailed exemplary configuration of the segment driving circuit and the anomalous segment detection circuit.

FIG. 21 is a sixth detailed exemplary configuration of the segment driving circuit 150 and the anomalous segment detection circuit 160. In the third to fifth detailed exemplary configurations described above, in the dual-line driving state, the switch circuit 20 outputs the segment driving signal SGQ' at the same logic level as the segment driving signal SGQ to the segment terminal TSD2. The sixth detailed exemplary configuration is configured such that, in the dual-line driving state, the switch circuit 20 outputs the segment driving signal SGQ to the segment terminal TSD2. Note that the constituent elements that are the same as the constituent elements that have already been described will be denoted by the same reference signs, and the description thereof will be omitted, as appropriate.

In FIG. 21, the segment signal output circuit 51, the driving circuit 55, and the switch circuit 10 in FIG. 16 are omitted. The switch circuit 20 includes switches SB3 and SB4. In the monitoring state in which SSW=L, the switches SB3 and SB4 select SMN'=STSD2. In the dual-line driving state in which SSW=H, the switch SB3 selects STSD2=SGQ, and the switch SB4 selects SMN'=L. The signal waveforms in the sixth detailed exemplary configuration are similar to those in FIG. 18.

6. Various Embodiments

Various embodiments that have not been described above will be described in the following.

In the liquid crystal driver 100 in FIGS. 1 and 2, the segment terminal TSD1, which is a first segment terminal, and the segment terminal TSD2, which is a second segment terminal are arranged adjacent to each other along a longitudinal direction of the liquid crystal driver 100. Similarly, the segment terminal TSD3 and the segment terminal TSD4 are arranged adjacent to each other along the longitudinal direction. The longitudinal direction is a direction along a long side HL of the liquid crystal driver 100.

The plurality of segment signal lines provided in the liquid crystal panel 200 are transparent conductive films on a glass substrate, and therefore the segment signal lines cannot intersect to each other. In the present embodiment, the segment terminals TSD1 and TSD2 are arranged adjacent to each other, and as a result, the segment signal lines LSD1 and LSD2 that connect the segment electrode ESD1 and the segment terminals TSD1 and TSD2 can be routed such that the segment signal lines LSD1 and LSD2 do not intersect other segment signal lines. The same applies to the segment terminals TSD3 and TSD4.

Figure 22:
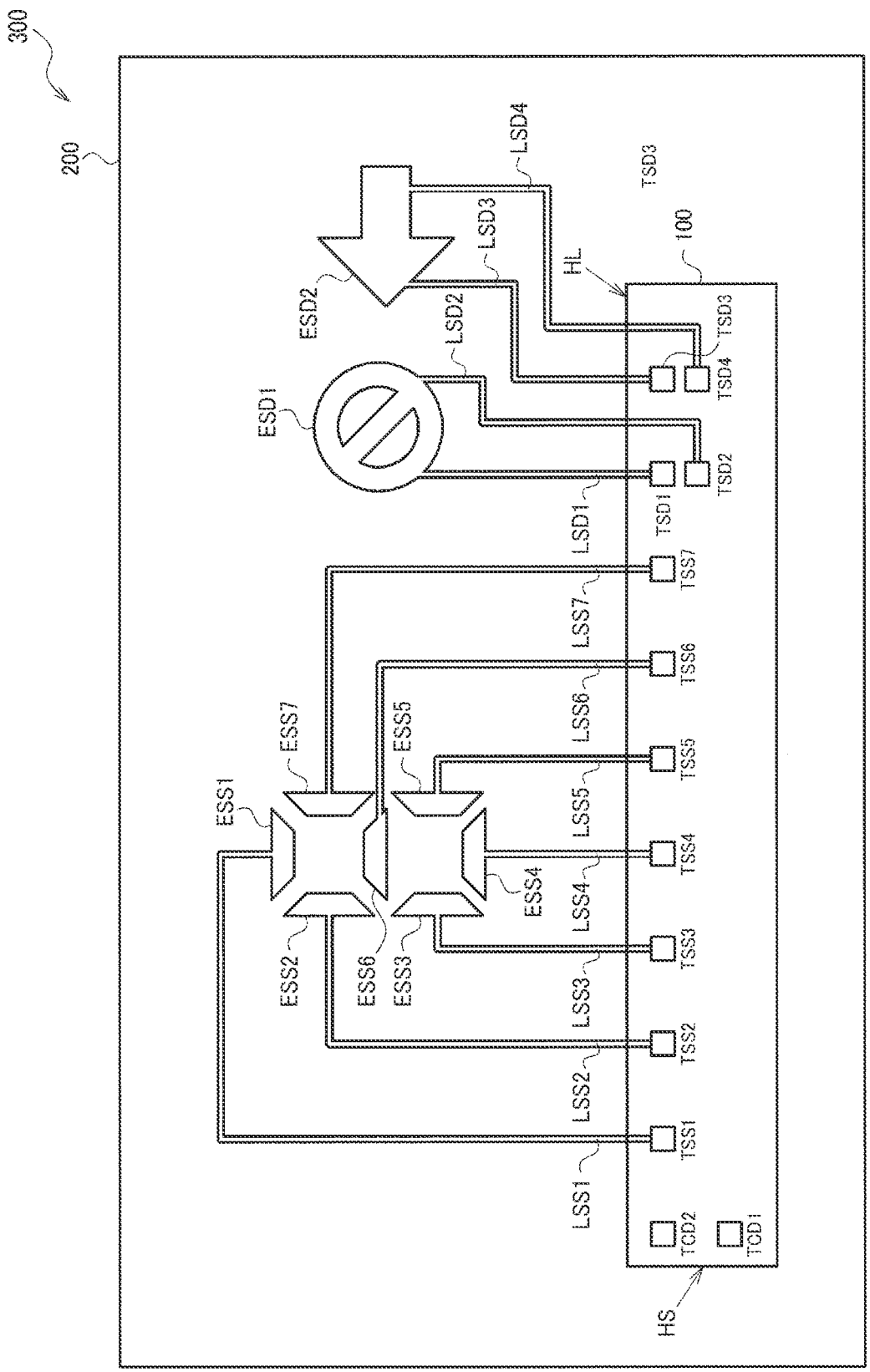
FIG. 22 is a second exemplary configuration of the liquid crystal device.

Note that the arrangement of the segment terminals is not limited to that described above. FIG. 22 is a second exemplary configuration of the liquid crystal device 300. In FIG. 22, the segment terminal TSD1, which is the first segment terminal, and the segment terminal TSD2, which is the second segment terminal are arranged adjacent to each other along a direction that intersects the longitudinal direction of the liquid crystal driver. Similarly, the segment terminal TSD3 and the segment terminal TSD4 are arranged adjacent to each other along the direction that intersects the longitudinal direction. The direction that intersects the longitudinal direction is a direction that intersects the long side HL of the liquid crystal driver 100, and is a direction along a short side HS of the liquid crystal driver 100, for example.

With this, the segment signal lines LSD1 and LSD2 that connect the segment electrode ESD1 and the segment terminals TSD1 and TSD2 can be routed such that the segment signal lines LSD1 and LSD2 do not intersect other segment signal lines. The same applies to the segment terminals TSD3 and TSD4, and the size of the liquid crystal driver 100 in the longitudinal direction can be reduced.

As shown in FIGS. 1 and 22, the segment signal line LSD1 and the segment signal line LSD2 that are connected to the segment electrode ESD1 are routed adjacent to each other. Similarly, the segment signal line LSD3 and the segment signal line LSD4 that are connected to the segment electrode ESD2 are routed adjacent to each other. Two segment signal lines being routed adjacent to each other means that another segment signal line is not provided between the two segment signal lines. For example, the segment signal lines LSD1 and LSD2 that are connected to the segment electrode ESD1 are routed side by side. Note that the distance between the segment signal lines LSD1 and LSD2 that are routed side by side need not be constant.

It is conceivable that the segment signal line LSD2 is routed so as to make a detour such that the segment electrode ESD2, the segment signal lines LSD3 and LSD4, and the segment terminals TSD3 and TSD4 are arranged between the segment signal lines LSD1 and LSD2, for example. However, the routing length increases, and the routing is estimated to become complex. In this regard, according to the present embodiment, as a result of the segment signal lines LSD1 and LSD2 that are connected to the same segment electrode ESD1 being routed adjacent to each other, the segment signal lines LSD1 and LSD2 can be routed so as to not intersect other segment signal lines, while realizing simple routing.

Figure 23:
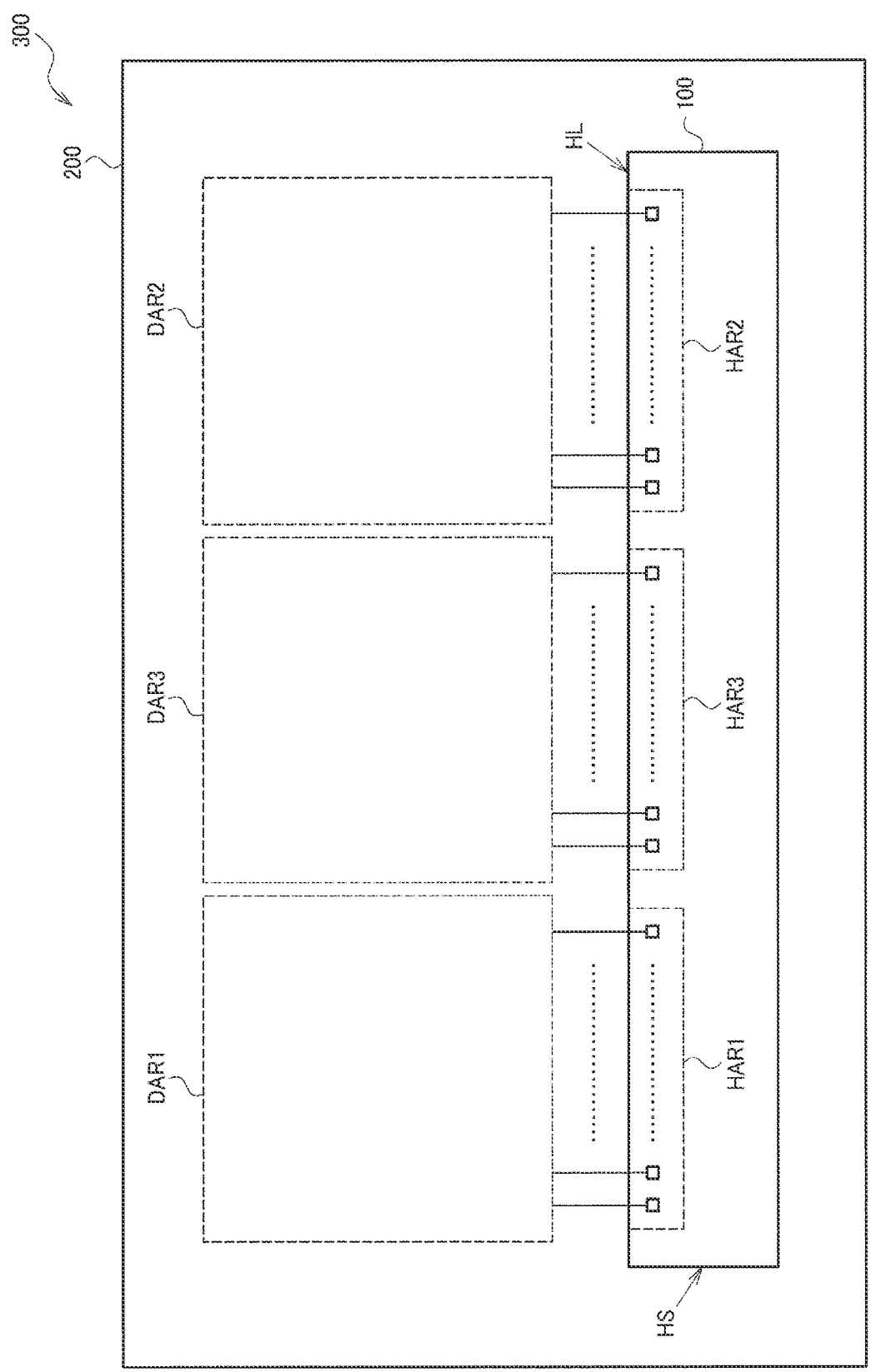
FIG. 23 is a third exemplary configuration of the liquid crystal device.

FIG. 23 is a third exemplary configuration of the liquid crystal device 300. In FIG. 23, the first segment terminal and the second segment terminal are arranged in a third region HAR3 between a first region HAR1 and a second region HAR2, on the long side HL of the liquid crystal driver 100. A third segment terminal is arranged in the first region HAR1 or the second region HAR2. The regions HAR1 to HAR3 are regions in which the segment terminals are arranged in the layout of the liquid crystal driver 100. The regions HAR1 to HAR3 are each rectangular, and the long side thereof is in parallel with the long side HL of the liquid crystal driver 100. For example, one of long sides of each of the regions HAR1 to HAR3 may be in contact with the long side HL of the liquid crystal driver 100.

When the segment electrodes or the like in FIG. 1 are taken as an example, the segment electrode ESD1 in FIG. 1 is the first segment electrode, and the segment signal lines LSD1 and LSD2 are respectively the first and second segment signal lines, and the segment terminals TSD1 and TSD2 are respectively the first and second segment terminals. Also, the segment electrode ESS1 in FIG. 1 is the second segment electrode, the segment signal line LSS1 is the third segment signal line, and the segment terminal TSS1 is the third segment terminal.

In the liquid crystal panel 200 in FIG. 23, the first segment electrode is arranged in a region DAR3 between a region DAR1 and a region DAR2. The second segment electrode is arranged in the region DAR1 or the region DAR2. A segment electrode arranged in the region DAR1 is connected to a segment terminal arranged in the region HAR1 of the liquid crystal driver 100. Similarly, segment electrodes arranged in the region DAR2 or DAR3 are connected to segment terminals arranged in the region HAR2 or HAR3 of the liquid crystal driver 100. That is, the liquid crystal driver 100 has a long side HL and short sides HS at the two ends thereof, and the region HAR3 is located further from the short sides HS across the respective regions HAR1 and HAR2, on the long side HL. Therefore, the first segment terminal and the second segment terminal are located further from one of the short sides HS relative to the third segment terminal, on the long side HL of the liquid crystal driver.

For example, when the liquid crystal device 300 is a cluster panel for an automobile, it is envisioned that icons are arranged in the region DAR3 around the center, and meters, numeric characters, and characters are arranged in the regions DAR1 and DAR2 on two sides of the region DAR3. As described above, when the degree of importance of the icons are assumed to be relatively high, segment electrode of the icons that are arranged in the region DAR3 are each connected to the liquid crystal driver 100 with two segment signal lines. One the other hand, when the degree of importance of the meters, numeric characters, and characters that are arranged in the regions DAR1 and DA2 are assumed to be relatively low, the segment electrodes are each connected to the liquid crystal driver 100 with one segment signal line.

According to the configuration in FIG. 23 described above, when segment electrodes of display whose degree of importance is high are arranged around the center, the segment terminals can be arranged in accordance with the arrangement.

Figure 24:
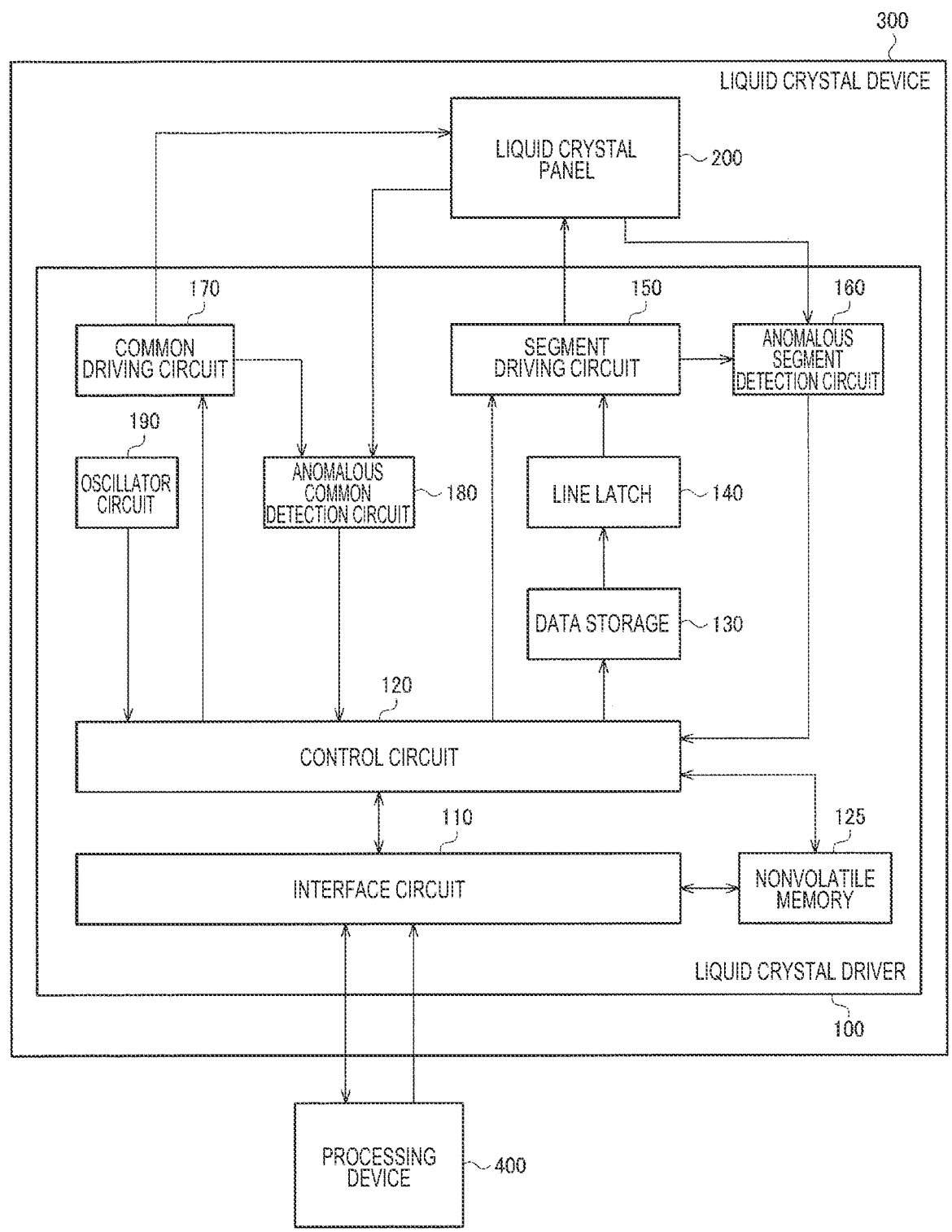
FIG. 24 is a second detailed exemplary configuration of the liquid crystal driver.

FIG. 24 is a second detailed exemplary configuration of the liquid crystal driver 100. In FIG. 24, the liquid crystal driver 100 includes a nonvolatile memory 125. The nonvolatile memory 125 is an EEPROM (Electrically Erasable Programmable Read Only Memory), a flash memory, or a memory using fuse cells, for example.

The nonvolatile memory 125 stores a detection history of anomalous driving of segment electrodes. That is, when the anomalous segment detection circuit 160 has detected anomalous driving, the control circuit 120 writes the history to the nonvolatile memory 125. The processing device 400 can acquire the detection history by accessing the nonvolatile memory 125 via the interface circuit 110. Note that the nonvolatile memory 125 may store the detection history of anomalous driving of common electrodes.

Various items to be stored in the detection history can be envisioned. For example, the detection history includes the number of detections of anomalous driving. That is, in the configuration in FIG. 4, when the detection signal SDETQ has become a high level, the control circuit 120 increments the number of detections stored in the nonvolatile memory 125 by one. Alternatively, the detection history includes the detection time of anomalous driving. The control circuit 120 may include a timer that measures time based on a clock signal from the oscillator circuit 190. When the detection signal SDETQ has become a high level, the control circuit 120 writes the output time of the timer to the nonvolatile memory 125. Alternatively, the detection history is a detection history of each segment terminal. In this case, the detection signals SDET1 to SDETn, which are detection results corresponding to the respective segment terminals, are input to the control circuit 120. The control circuit 120 writes the detection histories of the respective segment terminals to the nonvolatile memory 125 based on the detection signals SDET1 to SDETn.

According to the present embodiment, when the liquid crystal driver 100 is activated, the liquid crystal driver 100 or the processing device 400 can acquire the detection history from the nonvolatile memory 125. For example, when the dual-line driving described above is performed, as a result of referring to the detection history at the time of activation, the dual-line driving state can be set immediately after activation without detecting anomalous driving again.

Figure 25:
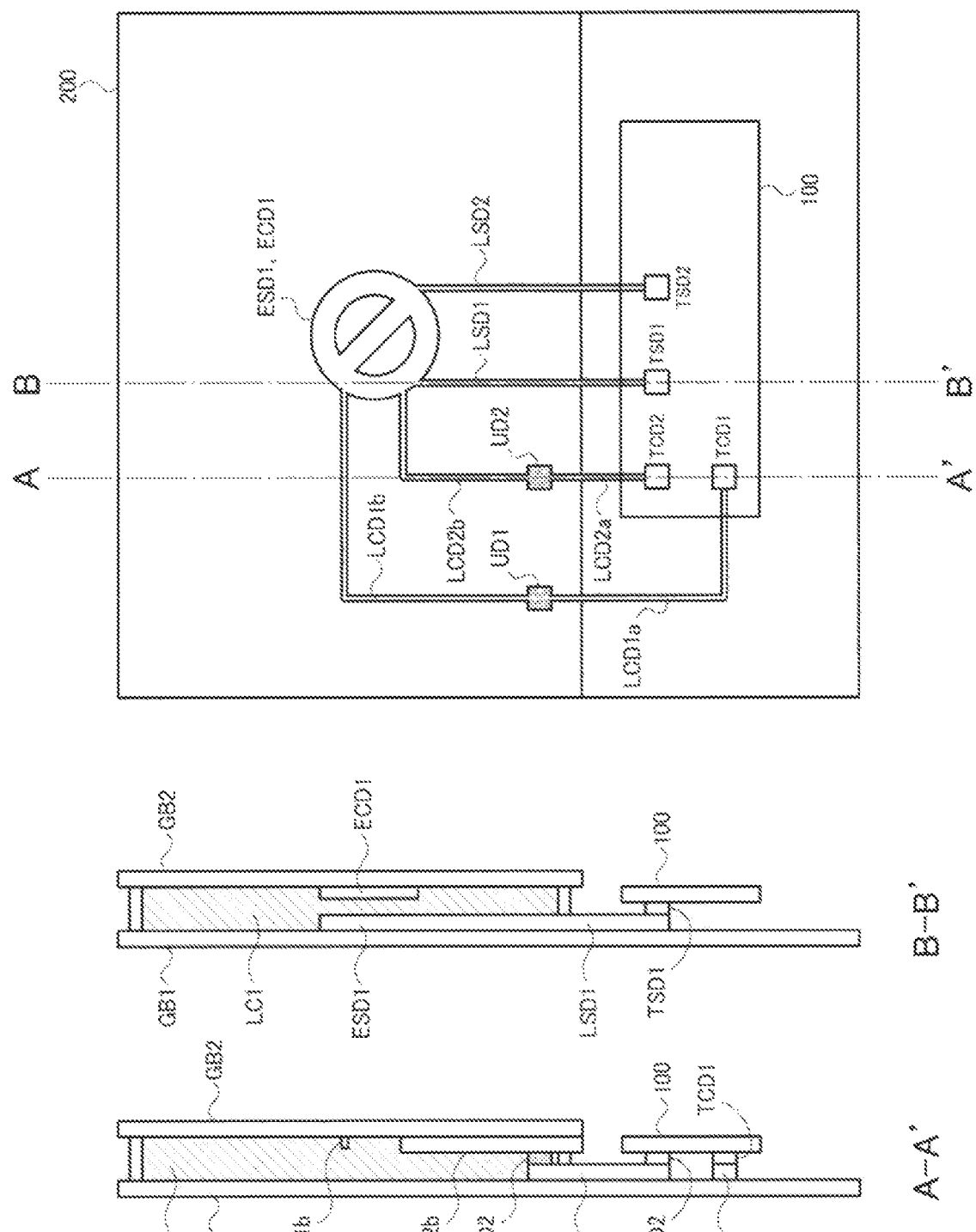
FIG. 25 is a detailed exemplary configuration of a liquid crystal panel.

FIG. 25 is a detailed exemplary configuration of the liquid crystal panel 200. FIG. 25 shows a plan view of the liquid crystal panel 200, a cross-sectional view taken along line A-A' in the plan view, and a cross-sectional view taken along line B-B' in the plan view. In FIG. 25, only the constituent elements related to the segment electrode ESD1 are shown.

The liquid crystal panel 200 includes glass substrates GB1 and GB2, the segment electrode ESD1, the segment signal lines LSD1 and LSD2, the common electrode ECD1, signal lines LCD1a, LCD1b, LCD2a, and LCD2b, and vertical conductive materials UD1 and UD2.

The glass substrate GB1 and the glass substrate GB2 face each other, and transparent conductive films and liquid crystal are provided therebetween. The liquid crystal driver 100 is mounted on the glass substrate GB1 at a portion that is not covered by the glass substrate GB2.

The segment electrode ESD1 and the segment signal lines LSD1 and LSD2, which are transparent conductive films, are formed on the glass substrate GB1. The segment terminals TSD1 and TSD2 are respectively connected to ends, on one side, of the segment signal lines LSD1 and LSD2. A portion, of the transparent conductive films formed on the glass substrate GB1, for applying a voltage to the liquid crystal LC1 with the common electrode ECD1 is the segment electrode ESD1. That is, the segment electrode ESD1 and the common electrode ECD1 are arranged so as to face each other, and the liquid crystal LC1 is provided therebetween. Note that the liquid crystal LC1 is also provided at a portion that is not sandwiched between the segment electrode ESD1 and the common electrode ECD1. As a result of applying voltage between the segment electrode ESD1 and the common electrode ECD1, the transmittance of the portion, of the liquid crystal, that is sandwiched between the segment electrode ESD1 and the common electrode ECD1 is controlled.

The signal lines LCD1a and LCD2a, which are transparent conductive films, are formed on the glass substrate GB1. The common terminals TCD1 and TCD2 are connected to respective ends, on one side, of the signal lines LCD1a and LCD2a. The signal lines LCD1b and LCD2b and the common electrode ECD1, which are transparent conductive films, are formed on the glass substrate GB2. Ends, on the other side, of the signal lines LCD1a and LCD2a and ends, on one side, of the signal lines LCD1b and LCD2b are respectively connected by vertical conductive materials UD1 and UD2. Ends, on the other side, of the signal lines LCD1b and LCD2b are connected to the common electrode ECD1. In FIG. 2, the common signal lines are illustrated by only transparent conductive films, but in FIG. 25, the common signal lines include transparent conductive films and vertical conductive materials. That is, the common signal line that connects the common terminal TCD1 and the common electrode ECD1 includes the signal lines LCD1a and LCD1b and the vertical conductive material UD1. The common signal line that connects the common terminal TCD2 and the common electrode ECD1 includes the signal lines LCD2a and LCD2b and the vertical conductive material UD2.

In this way, the common signal lines may include a conductor other than transparent conductive films. Similarly, the segment signal lines may include a conductor other than transparent conductive films.

Figure 26:
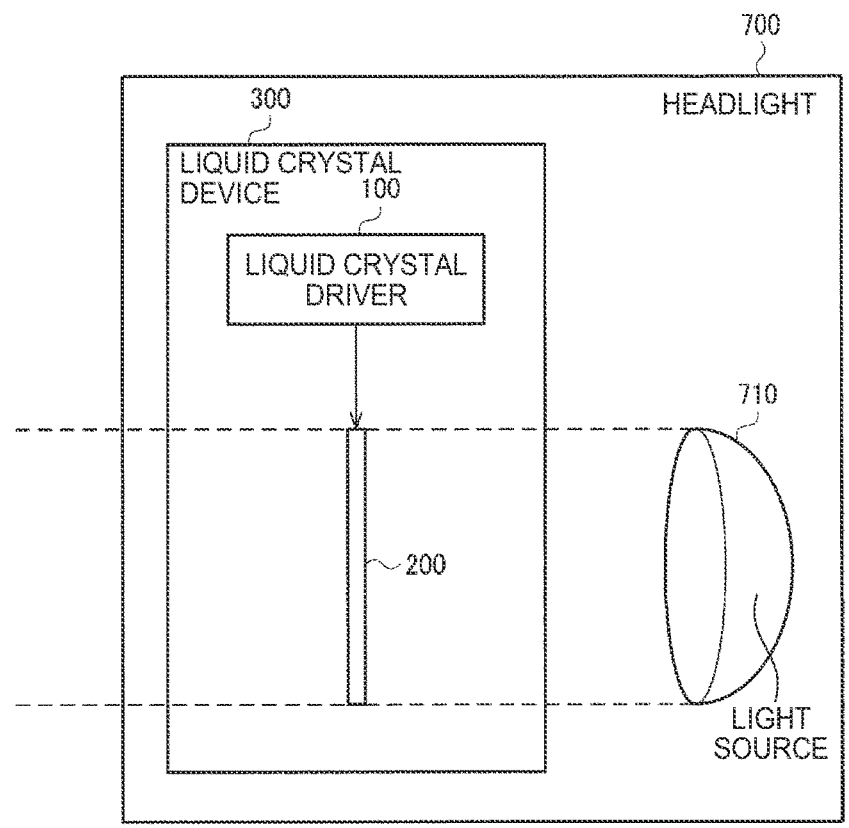
FIG. 26 is an exemplary configuration of a headlight including the liquid crystal device.
Figure 27:
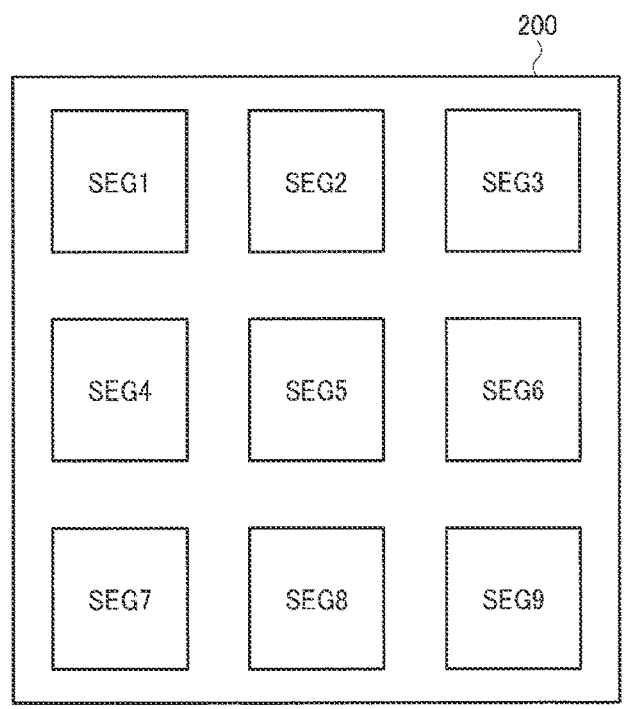
FIG. 27 is an example of the liquid crystal panel that is applied to the headlight.

In FIGS. 1 to 25, a case where the liquid crystal device 300 is a display device has been described as an example, but the liquid crystal device 300 is not limited to the display device. For example, the liquid crystal device 300 may be a liquid crystal shutter that controls transmission and blocking of light. A headlight is an example of the device to which the liquid crystal shutter can be applied. FIG. 26 is an exemplary configuration of a headlight 700 including the liquid crystal device 300. Also, FIG. 27 shows an example of the liquid crystal panel 200 to be applied to the headlight.

The headlight 700 includes the liquid crystal device 300 and a light source 710. The light source 710 is an LED (Light Emitting Diode). Alternatively, the light source 710 may be a halogen lamp or a Xenon lamp. The liquid crystal device 300 includes the liquid crystal driver 100 and the liquid crystal panel 200.

A plurality of segments SEG1 to SEG9 are provided in the liquid crystal panel 200. The segments SEG1 to SEG9 are each a liquid crystal cell. The segments SEG1 to SEG9 are arranged in a 3×3 matrix, for example, but the arrangement is not limited thereto. Note that illustration of the segment signal lines and the common signal lines are omitted in FIG. 27.

The liquid crystal driver 100 controls turning on or off of each of the segments SEG1 to SEG9. Here, "being turned on" means a transmissive state, and "being turned off" means a blocking state. The light source 710 emits light toward the liquid crystal panel 200, the light passes through the liquid crystal cells that are turned on, and the light is emitted toward an object to be illuminated by the headlight 700. The liquid crystal cells that are turned off block the light from the light source 710. That is, each of the segments SEG1 to SEG9 functions as a shutter. The light distribution of the headlight 700 changes in accordance with the on/off state of the segments SEG1 to SEG9. For example, as a result of the liquid crystal driver 100 turning off the segments SEG1 to SEG3 and turning on the segments SEG4 to SEG9, a so-called low beam can be realized. Also, as a result of the liquid crystal driver 100 turning on the segments SEG1 to SEG9, a so-called high beam can be realized.

Note that the application example of the liquid crystal shutter is not limited to the headlight. For example, a liquid crystal device including the liquid crystal shutter may be combined with an active matrix type display device. In this case, a segment is provided in a liquid crystal panel of the liquid crystal device so as to cover the screen of the active matrix type display device, and the segment function as a liquid crystal shutter. Segments corresponding to various display items may be provided in the liquid crystal panel other than the segment that functions as the liquid crystal shutter. The liquid crystal device and the active matrix type display device are arranged such that a user views the active matrix type display device through the liquid crystal shutter. Also, as a result of the liquid crystal driver 100 turning on the liquid crystal shutter, the user can view the display of the active matrix type display device through the liquid crystal shutter. Also, as a result of the liquid crystal driver 100 turning off the liquid crystal shutter, the display of the active matrix type display device is blocked by the liquid crystal shutter, and the user cannot view the display.

Figure 28:
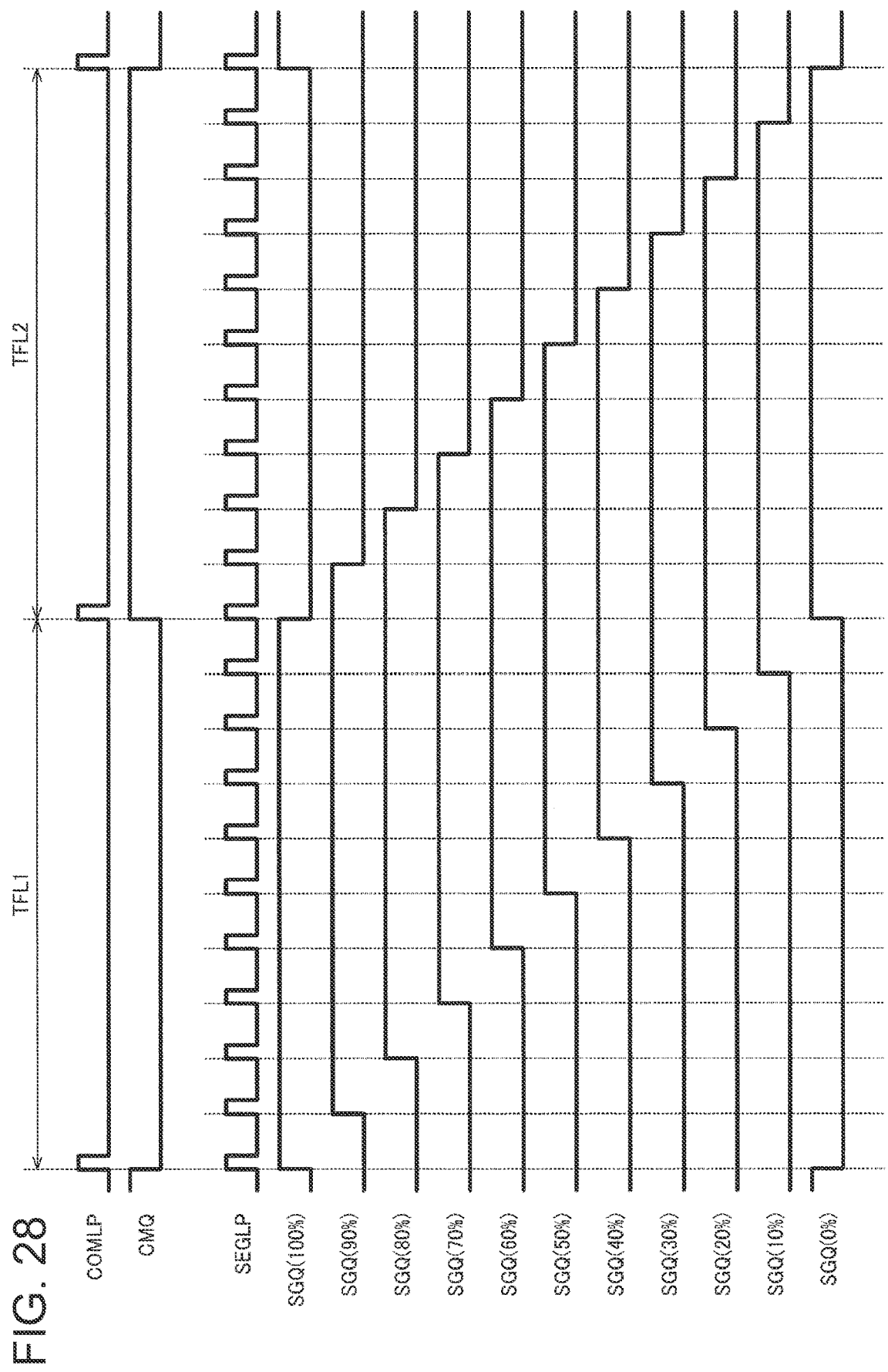
FIG. 28 shows exemplary signal waveforms in PWM driving.

In the exemplary signal waveforms in FIGS. 5 to 8 described above, a case where the voltages applied to the respective segment electrodes do not change during one frame, in static driving, has been described as an example. However, the driving method is not limited thereto, and PWM driving in which the voltages applied to the respective segment electrodes change midway in one frame, in static driving, may be performed. FIG. 28 shows exemplary signal waveforms when the liquid crystal driver performs PWM driving on the segment electrodes.

COMLP indicates a latch pulse that the control circuit 120 outputs to the common driving circuit 170. The period between adjacent rising edges of the latch pulse COMLP is one frame. A frame TFL1 is a positive polarity frame and a frame TFL2 is a negative polarity frame. In the frame TFL1, common driving signal CMQ=L, and in the frame TFL2, common driving signal CMQ=H. The operations of the common driving circuit 170 are the same as the operations described in FIG. 11 and the like.

Here, assume that the number of tones is 11. In PWM driving in static driving, the transmittance of liquid crystal takes two values, namely 0% and 100%. The tones can be realized, in time average, by changing the duty of the period in which the transmittance is 100%. The tones in time average are referred to as 100% tone, 90% tone, and so on, and 0% tone.

SEGLP indicates a latch pulse that the control circuit 120 outputs to the segment driving circuit 150. The latch pulse SEGLP includes 10 pulses in one frame at equal intervals. The number of pulses is a number obtained by subtracting one from the number of tones. At 100% tone, segment driving signal SGQ=H, from the first latch pulse in the frame TFL1 to the first latch pulse in the frame TFL2. At 90% tone, segment driving signal SGQ=H, from the second latch pulse in the frame TFL1 to the second latch pulse in the frame TFL2. The same applies to the other tones, and at 0% tone, segment driving signal SGQ=H, from the tenth latch pulse in the frame TFL1 to the tenth latch pulse in the frame TFL2.

The method of detecting anomalous driving is the same as the method described in FIG. 4 and the like. That is, the anomalous segment detection circuit 160 detects anomalous driving by comparing the segment signal SLAT, the segment driving signal SGQ, and the segment monitoring signal SMN. Only the timing at which the segment driving signal SGQ changes differs from the exemplary signal waveforms in FIGS. 5 to 8, and the detection method in which anomalous driving is detected when the logic levels of the segment signal SLAT, the segment driving signal SGQ, and the segment monitoring signal SMN do not match is the same.

In this way, the anomalous driving detection method of the present embodiment can be applied to the PWM driving.

7. Electronic Apparatus and Mobile Body

Figure 29:
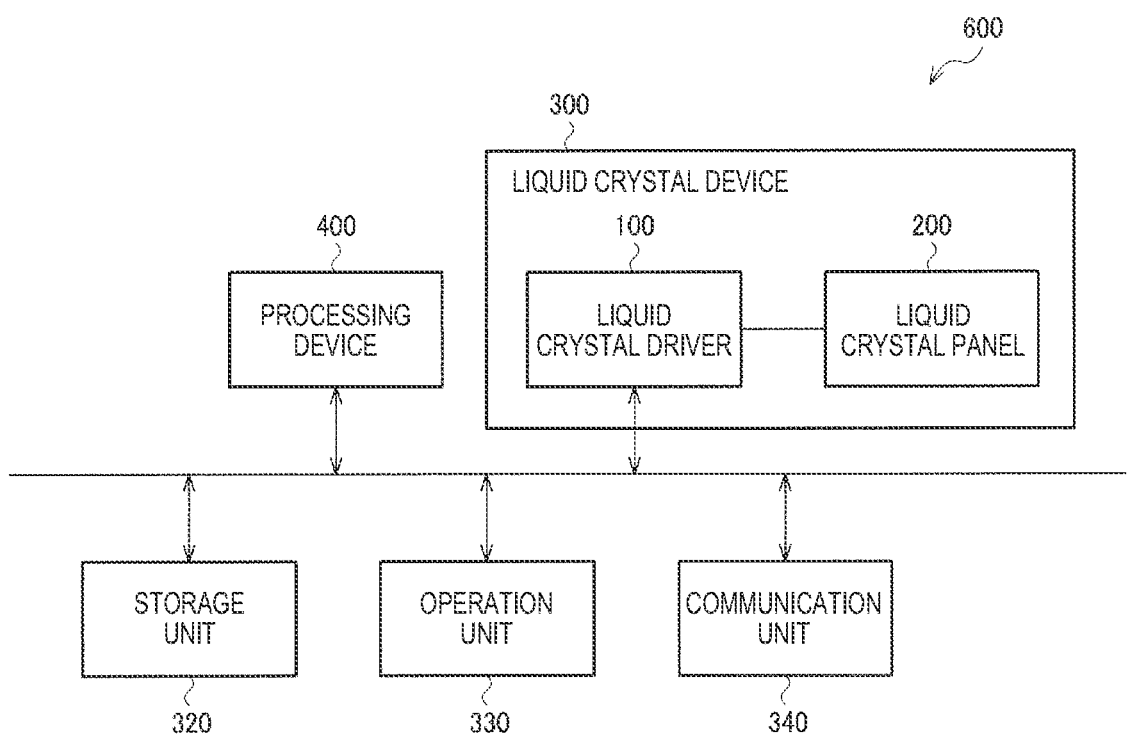
FIG. 29 is an exemplary configuration of an electronic apparatus.

FIG. 29 is an exemplary configuration of an electronic apparatus 600 including the liquid crystal device 300 of the present embodiment. Various electronic apparatuses on which the liquid crystal device is mounted can be envisioned as the electronic apparatus of the present embodiment. For example, an on-board device, a display, a projector, a television device, an information processing device, a mobile information terminal, a car navigation system, a mobile game terminal, and a DLP (Digital Light Processing) device can be envisioned as the electronic apparatus of the present embodiment. The on-board device is an on-board display device such as a cluster panel, a headlight using the liquid crystal shutter, or the like. The cluster panel is a display panel that is provided in front of the driver's seat and in which a meter and the like are displayed.

The electronic apparatus 600 includes a processing device 400, a liquid crystal device 300, a storage unit 320, an operation unit 330, and a communication unit 340. The liquid crystal device 300 includes the liquid crystal driver 100 and the liquid crystal panel 200. Note that the storage unit 320 is a storage device or a memory. The operation unit 330 is an operation device. The communication unit 340 is a communication device.

The operation unit 330 is a user interface for receiving various operations made by a user. The operation unit 330 is constituted by a button, a mouse, a keyboard, and a touch panel attached to the liquid crystal panel 200, for example. The communication unit 340 is a data interface for performing communication of image data and control data. The communication unit 340 is a wired communication interface such as a USB or a wireless communication interface such as a wireless LAN, for example. The storage unit 320 stores image data input from the communication unit 340. Alternatively, the storage unit 320 functions as a working memory of the processing device 400. The processing device 400 performs processing to control the units of the electronic apparatus, and various types of data processing. The processing device 400 converts the format of image data received by the communication unit 340 or image data stored in the storage unit 320 to a format that the liquid crystal driver 100 can accept, and outputs the converted image data to the liquid crystal driver 100. The liquid crystal driver 100 drives the liquid crystal panel 200 based on the image data transferred from the processing device 400.

Figure 30:
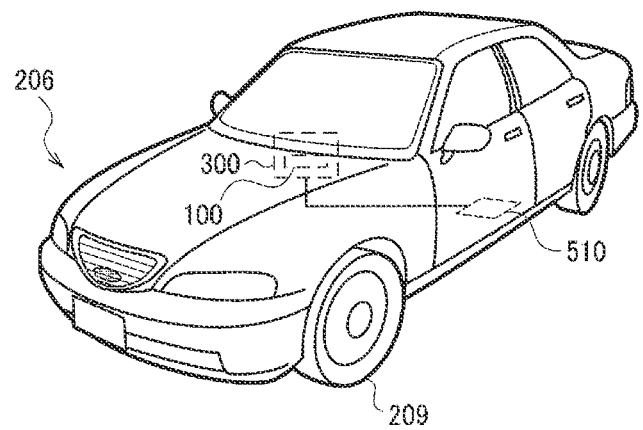
FIG. 30 is an exemplary configuration of a mobile body.

FIG. 30 is an exemplary configuration of a mobile body including the liquid crystal device 300 of the present embodiment. The mobile body is an apparatus or device that includes a drive mechanism such as an engine or a motor, steering mechanisms such as a steering wheel or a rudder, and various electronic apparatus, for example, and moves on the ground, in the air, and on the sea. Various types of mobile bodies such as a car, an airplane, a motorcycle, a ship, a mobile robot, and a walking robot can be envisioned as the mobile body of the present embodiment, for example. FIG. 30 schematically illustrates an automobile 206 serving as a specific example of the mobile body. The liquid crystal device 300 including the liquid crystal driver 100 and a control device 510 that controls the units of the automobile 206 are incorporated into the automobile 206. The control device 510 creates an image that shows pieces of information such as speed, remaining fuel amount, travel distance, and settings of various types of devices to a user, and transmits the image to the liquid crystal device 300 for causing the liquid crystal device 300 to display the image. Alternatively, the automobile 206 may include the headlight described above, and the control device 510 may control the liquid crystal device 300 of the headlight.

The liquid crystal device described above includes a liquid crystal panel and a liquid crystal driver that drives the liquid crystal panel. The liquid crystal panel includes a first segment electrode, a first segment signal line connected to the first segment electrode, and a second segment signal line connected to the first segment electrode. The liquid crystal driver includes a first segment terminal to be connected to the first segment signal line, a segment driving circuit, a second segment terminal to be connected to the second segment signal line, and an anomalous segment detection circuit. The segment driving circuit outputs a first segment driving signal for driving the first segment electrode to the first segment terminal. The anomalous segment detection circuit detects anomalous driving of the first segment electrode based on a segment monitoring signal input to the second segment terminal from the first segment electrode via the second segment signal line.

In this way, the first segment driving signal is output from the first segment terminal to the first segment electrode via the first segment signal line. The first segment driving signal is fed back to the second segment terminal from the first segment electrode via the second segment signal line. This fed-back signal is the segment monitoring signal. With this, the anomalous segment detection circuit detects anomalous driving of the first segment electrode based on the segment monitoring signal. That is, the anomalous segment detection circuit determines whether or not the first segment driving signal has been properly applied to the first segment electrode.

Also, in the present embodiment, the liquid crystal driver may include: a common driving circuit that outputs a common driving signal for driving a common electrode of the liquid crystal panel, a first common terminal from which the common driving signal is to be output to the common electrode, a second common terminal to which a common monitoring signal, which is a monitoring signal from the common electrode, is to be input, and an anomalous common detection circuit that detects anomalous driving of the common electrode based on the common monitoring signal.

In this way, the common driving signal output from the first common terminal to the common electrode is fed back to the second common terminal from the common electrode as the common monitoring signal. With this, the anomalous common detection circuit can detect anomalous driving of the common electrode. That is, the anomalous common detection circuit can determine whether or not the common driving signal has been properly applied.

Also, in the present embodiment, when anomalous driving of the first segment electrode is detected, the segment driving circuit may output the first segment driving signal or a second segment driving signal for driving the first segment electrode separately from the first segment driving signal to the second segment terminal.

In this way, even in a case where the first segment driving signal is no longer applied to the first segment electrode due to disconnection or the like of the first segment signal line, the first segment driving signal or the second segment driving signal for driving the first segment electrode separately from the first segment driving signal is output from the second segment terminal to the first segment electrode via the second segment signal line. With this, the first segment electrode can be continuously driven.

Also, in the present embodiment, in the liquid crystal device, the segment driving circuit may include a switch circuit. While anomalous driving of the first segment electrode is not detected, the switch circuit may output the segment monitoring signal input to the second segment terminal to the anomalous segment detection circuit. When anomalous driving of the first segment electrode has been detected, the switch circuit may output the first segment driving signal or the second segment driving signal for driving the first segment electrode separately from the first segment driving signal to the second segment terminal.

In this way, while anomalous driving of the first segment electrode is not detected, the segment monitoring signal is input to the anomalous segment detection circuit via the switch circuit. Also, when anomalous driving of the first segment electrode has been detected, the segment driving circuit can output the first segment driving signal or the second segment driving signal to the second segment terminal.

Also, in the present embodiment, the segment driving circuit may include a segment signal output circuit that outputs a segment signal based on segment driving data, and an output circuit that outputs the first segment driving signal based on the segment signal. The anomalous segment detection circuit may detect anomalous driving by comparing the segment monitoring signal and the segment signal.

In this way, since the first segment driving signal is output based on the segment signal, the anomalous segment detection circuit can determine whether or not the signal level of the segment monitoring signal is the same as the signal level of the first segment driving signal by comparing the segment monitoring signal and the segment signal. With this, anomalous driving of the first segment electrode can be detected.

Also, in the present embodiment, the first segment terminal and the second segment terminal may be arranged adjacent to each other.

In this way, as a result of the first segment terminal and the second segment terminal being arranged adjacent to each other, a plurality of segment signal lines that are respectively formed by transparent conductive films in the liquid crystal panel can be arranged so as to not intersect each other.

Also, in the present embodiment, the first segment terminal and the second segment terminal may be arranged adjacent to each other along a longitudinal direction of the liquid crystal driver.

In this way, the first and second segment signal lines connected to the first segment electrode are respectively connected to the first and second segment terminals that are arranged adjacent to each other along the longitudinal direction of the liquid crystal driver. With this, the first and second segment signal lines can be routed so as to not intersect other segment signal lines on the liquid crystal panel.

Also, in the present embodiment, the first segment terminal and the second segment terminal may be arranged adjacent to each other along a direction that intersects the longitudinal direction of the liquid crystal driver.

Also, in the present embodiment, the first segment terminal and the second segment terminal may be arranged adjacent to each other along a direction that intersects the longitudinal direction of the liquid crystal driver.

In this way, as a result of the first segment terminal and the second segment terminal being arranged along a direction that intersects the longitudinal direction of the liquid crystal driver, the size of the liquid crystal driver in the longitudinal direction can be reduced.

Also, in the present embodiment, the liquid crystal panel may include a second segment electrode and a third segment signal line connected to the second segment electrode. The first segment electrode may be connected to the liquid crystal driver via the first segment signal line and the second segment signal line, and the second segment electrode may be connected to the liquid crystal driver via the third segment signal line.

In this way, the first segment electrode to be connected to the liquid crystal driver via the first and second segment signal lines, which are two segment signal lines, can be provided along with the second segment electrode to be connected to the liquid crystal driver via the third segment signal line, which is one segment signal line. For example, the number of segment signal lines connected to a segment electrode can be selected in accordance with the degree of importance of the segment, the necessity of anomaly detection, or the like.

Also, in the present embodiment, the liquid crystal driver may have short sides at the two ends of the long side. Also, the liquid crystal driver may include a third segment terminal to which the third segment signal line is to be connected. The first segment terminal and the second segment terminal may be arranged at a position, on the long side of the liquid crystal driver, further from one of the short sides relative to the third segment terminal.

In this way, segment electrodes to each of which two segment signal lines are connected can be arranged around a central region of the liquid crystal panel. Also, segment electrodes to each of which one segment signal line is connected can be arranged outside of the central region. For example, when segment electrodes, of the segment electrodes included in the liquid crystal panel, whose degree of importance is relatively high are arranged around the central region, the segment terminals can be arranged in accordance with the arrangement of the segment electrodes.

Also, in the present embodiment, the first segment electrode may be an electrode for displaying an icon. The second segment electrode may be an electrode for displaying a numeric character, a character, or a meter.

In this way, the first segment electrode for displaying an icon is to be connected to two segment terminals of the liquid crystal driver via two segment signal lines. On the other hand, the second segment electrode for displaying a numeric character, a character, or a meter is to be connected to one segment terminal in the liquid crystal driver via one segment signal line. With this, anomalous driving of the segment electrode for displaying an icon, of the segment electrodes for displaying an icon, a numeric character, a character, and a meter, can be detected.

Also, in the present embodiment, the first segment electrode may be an electrode for a liquid crystal shutter.

In this way, anomalous driving of the first segment electrode for a liquid crystal shutter can be detected. For example, when a liquid crystal shutter used in a headlight stops functioning, this anomaly can be detected.

Also, an electronic apparatus of the present embodiment includes the liquid crystal device according to any of the above descriptions.

Also, a mobile body of the present embodiment includes the liquid crystal device according to any of the above descriptions.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the liquid crystal driver, the liquid crystal panel, the liquid crystal device, the electronic apparatus, and the mobile body are not limited to those described in the present embodiment, and various modifications are possible.

What is claimed is:

1. A liquid crystal device comprising:
   a liquid crystal panel; and
   a liquid crystal driver configured to drive the liquid crystal panel,
   wherein the liquid crystal panel includes:
   a first segment electrode;
   a first segment signal line connected to the first segment electrode; and
   a second segment signal line connected to the first segment electrode, wherein the first segment signal line, the first segment electrode and the second segment signal line are in series with the first segment electrode between the first segment signal line and the second segment signal line, and
   the liquid crystal driver includes:
   a first segment terminal connected to the first segment signal line;
   a second segment terminal connected to the second segment signal line; and
   a segment driving circuit configured to input a segment monitoring signal to the second segment terminal from the first segment electrode through the second segment signal line.

2. The liquid crystal device according to claim 1, wherein the liquid crystal driver includes:
   a common driving circuit configured to output a common driving signal for driving a common electrode of the liquid crystal panel;
   a first common terminal from which the common driving signal is output to the common electrode; and
   a second common terminal to which a common monitoring signal, which is a monitoring signal from the common electrode, is input.

3. The liquid crystal device according to claim 1,
   wherein the segment driving circuit includes:
   a segment signal output circuit configured to output a segment signal based on segment driving data; and
   an output circuit configured to output a first segment driving signal based on the segment signal, and
   further comprising an anomalous segment detection circuit configured to detect anomalous driving by comparing the segment monitoring signal and the segment signal.

4. The liquid crystal device according to claim 1, wherein the first segment terminal and the second segment terminal are arranged adjacent to each other.

5. The liquid crystal device according to claim 1, wherein the first segment terminal and the second segment terminal are arranged adjacent to each other along a longitudinal direction of the liquid crystal driver.

6. The liquid crystal device according to claim 1, wherein the first segment terminal and the second segment terminal are arranged adjacent to each other along a direction that intersects a longitudinal direction of the liquid crystal driver.

7. The liquid crystal device according to claim 1,
   wherein the liquid crystal panel includes:
   a second segment electrode; and
   a third segment signal line connected to the second segment electrode,
   the first segment electrode is connected to the liquid crystal driver via the first segment signal line and the second segment signal line, and
   the second segment electrode is connected to the liquid crystal driver via the third segment signal line.

8. The liquid crystal device according to claim 7,
   wherein the liquid crystal driver has short sides at two ends of a long side, and includes a third segment terminal to which the third segment signal line is connected, and
   the first segment terminal and the second segment terminal are arranged at a position, on the long side of the liquid crystal driver, further from one of the short sides relative to the third segment terminal.

9. The liquid crystal device according to claim 7,
   wherein the first segment electrode is an electrode for displaying an icon, and
   the second segment electrode is an electrode for displaying a numeric character, a character, or a meter.

10. The liquid crystal device according to claim 1, wherein the first segment electrode is an electrode for a liquid crystal shutter.

11. An electronic apparatus comprising the liquid crystal device according to claim 1.

12. A mobile body comprising the liquid crystal device according to claim 1.

* * * * *